United States Patent
Eckert et al.

(10) Patent No.: US 11,632,322 B2
(45) Date of Patent: Apr. 18, 2023

(54) PREFERRED PATH ROUTE GRAPHS IN A NETWORK

(71) Applicant: HUAWEI TECHNOLOGIES CO., LTD., Shenzhen (CN)

(72) Inventors: Toerless Eckert, Mountain View, CA (US); Uma S. Chunduri, Fremont, CA (US); Yingzhen Qu, San Jose, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/110,813

(22) Filed: Dec. 3, 2020

(65) Prior Publication Data
US 2021/0092041 A1    Mar. 25, 2021

Related U.S. Application Data

(63) Continuation of application No. PCT/US2019/030440, filed on May 2, 2019.

(60) Provisional application No. 62/680,356, filed on Jun. 4, 2018.

(51) Int. Cl.
*H04L 45/02* (2022.01)
*H04L 45/24* (2022.01)
*H04L 45/74* (2022.01)
*H04L 47/17* (2022.01)

(52) U.S. Cl.
CPC .............. *H04L 45/02* (2013.01); *H04L 45/24* (2013.01); *H04L 45/74* (2013.01); *H04L 47/17* (2013.01)

(58) Field of Classification Search
None
See application file for complete search history.

(56) References Cited

U.S. PATENT DOCUMENTS

| | | | |
|---|---|---|---|
| 5,502,816 A | 3/1996 | Gawlick et al. | |
| 7,751,405 B1 | 7/2010 | Kompella | |
| 8,830,826 B2 | 9/2014 | Chen | |
| 8,995,303 B1 * | 3/2015 | Brar | H04W 40/248 370/254 |
| 9,369,371 B2 | 6/2016 | Filsfils et al. | |
| 9,450,817 B1 | 9/2016 | Bahadur et al. | |

(Continued)

FOREIGN PATENT DOCUMENTS

| | | |
|---|---|---|
| CN | 101036134 A | 9/2007 |
| CN | 101401083 A | 4/2009 |

(Continued)

OTHER PUBLICATIONS

Alimi, Ed., et al., "Application-Layer Traffic Optimization (ALTO) Protocol," RFC 7285, Sep. 2014, 91 pages.

(Continued)

*Primary Examiner* — Phirin Sam
(74) *Attorney, Agent, or Firm* — Conley Rose, P.C.

(57) ABSTRACT

A method implemented by a network element (NE) in a network, comprising receiving, by the NE, preferred path route (PPR) information describing a PPR graph, the PPR graph representing a plurality of PPRs between an ingress NE and an egress NE in the network, and updating, by the NE, a forwarding database to include a forwarding entry for the egress NE in response to identifying the NE in the plurality of PPR-PDEs, the forwarding entry indicating a next hop by which to forward a data packet comprising the PPR-ID.

20 Claims, 18 Drawing Sheets

(56) References Cited

U.S. PATENT DOCUMENTS

| | | | |
|---|---|---|---|
| 9,660,897 | B1 | 5/2017 | Gredler |
| 9,838,246 | B1 | 12/2017 | Hegde et al. |
| 10,003,519 | B2 | 1/2018 | Lee |
| 10,122,614 | B2 | 11/2018 | Eckert et al. |
| 10,142,220 | B2 | 11/2018 | Santos et al. |
| 10,178,029 | B2 | 1/2019 | Levy et al. |
| 10,460,066 | B1* | 10/2019 | Posser .................. G06F 30/394 |
| 10,547,538 | B2 | 1/2020 | Chen et al. |
| 11,032,197 | B2 | 6/2021 | Nainar et al. |
| 2003/0005149 | A1 | 1/2003 | Haas et al. |
| 2003/0014540 | A1 | 1/2003 | Sultan et al. |
| 2004/0208119 | A1 | 10/2004 | Christodoulou et al. |
| 2006/0117110 | A1 | 6/2006 | Vasseur et al. |
| 2007/0214275 | A1 | 9/2007 | Mirtorabi et al. |
| 2008/0075016 | A1 | 3/2008 | Ashwood-Smith |
| 2009/0185494 | A1 | 7/2009 | Li et al. |
| 2010/0220736 | A1 | 9/2010 | Mohapatra et al. |
| 2011/0032945 | A1 | 2/2011 | Mullooly |
| 2011/0069713 | A1 | 3/2011 | Mariblanca Nieves |
| 2012/0158639 | A1* | 6/2012 | Moore .................. G06F 16/282 706/55 |
| 2013/0103739 | A1 | 4/2013 | Salgueiro et al. |
| 2013/0163467 | A1* | 6/2013 | Tesov .................... H04L 45/126 370/254 |
| 2013/0286846 | A1 | 10/2013 | Atlas et al. |
| 2014/0379910 | A1 | 12/2014 | Saxena et al. |
| 2015/0055654 | A1 | 2/2015 | Song |
| 2015/0078205 | A1 | 3/2015 | Stoger |
| 2015/0229618 | A1 | 8/2015 | Wan et al. |
| 2015/0244607 | A1 | 8/2015 | Han |
| 2015/0244628 | A1 | 8/2015 | Gredler et al. |
| 2016/0189035 | A1* | 6/2016 | Shakeri .................... G09B 5/00 706/47 |
| 2016/0192029 | A1 | 6/2016 | Bergstrom |
| 2016/0308758 | A1 | 10/2016 | Li et al. |
| 2017/0012895 | A1 | 1/2017 | Zhao et al. |
| 2017/0061138 | A1 | 3/2017 | Lambert |
| 2017/0104668 | A1 | 4/2017 | Zhang et al. |
| 2017/0187629 | A1 | 6/2017 | Shalev et al. |
| 2017/0230276 | A1 | 8/2017 | Ceccarelli et al. |
| 2017/0289027 | A1 | 10/2017 | Ratnasingham |
| 2017/0346718 | A1 | 11/2017 | Psenak et al. |
| 2018/0004751 | A1* | 1/2018 | Vikhe ............... G06F 16/24578 |
| 2018/0254974 | A1* | 9/2018 | Seo ..................... H04L 43/0805 |
| 2018/0351864 | A1 | 12/2018 | Jeganathan et al. |
| 2019/0058657 | A1 | 2/2019 | Chunduri et al. |
| 2019/0278284 | A1* | 9/2019 | Zhang .............. G08G 1/096708 |
| 2020/0021515 | A1 | 1/2020 | Michael et al. |
| 2021/0176168 | A1* | 6/2021 | Eckert .................. H04L 45/302 |

FOREIGN PATENT DOCUMENTS

| | | | |
|---|---|---|---|
| CN | 106063203 | A | 10/2016 |
| CN | 106301952 | A | 1/2017 |
| CN | 107637031 | A | 1/2018 |
| WO | 2015167479 | A1 | 11/2015 |
| WO | 2017141078 | A1 | 8/2017 |

OTHER PUBLICATIONS

Crabbe, et al, "Path Computation Element Communication Protocol (PCEP) Extensions for PCE-Initiated LSP Setup in a Stateful PCE Model," RFC 8281, Dec. 2017, 20 pages.
Filsfils, Ed., et al., "Segment Routing Architecture," RFC 8402, Jul. 2018, 32 pages.
Chunduri, "BGP Link-State extensions for NSPF ID," draft-chunduri-idr-bgp-ls-nspfid-00, Apr. 2, 2018, 7 pages.
Chunduri, Ed., et al., "Usage of Non Shortest Path Forwarding (NSPF) IDs in IS-IS," draft-ct-isis-nspfid-for-sr-paths-01, Mar. 23, 2018, 16 pages.
Chunduri, et al., "Usage of Non Shortest Path Forwarding (NSPF) IDs in OSPF," draft-ct-ospf-nspfid-for-sr-paths-00, Mar. 24, 2018, 14 pages.
Chunduri, et al., "Usage of Non Shortest Path Forwarding (NSPF) lds in IGPs," draft-ct-isis-nspfid-for-sr-paths-00; draft-ct-ospf-nspfid-for-sr-paths-00, LSR WG, IETF 101, London, Mar. 17-23, 2018, 10 pages.
U.S. Appl. No. 62/634,425, filed Feb. 23, 2018, "Advertising and Programming a Non-Shortest Path Forwarding Identifier in Interior Gateway Protocols," 28 pages.
U.S. Appl. No. 62/649,355, filed Mar. 28, 2018, "Method and Apparatus for Non Shortest Path Forwarding Identifiers (NSPF ID) Distribution and Maintenance," 13 pages.
U.S. Appl. No. 62/663,115, filed Apr. 26, 2018, "Resource Reservations and Maintenance For Preferred Paths In The Network Through Routing Protocols," 22 pages.
Previdi, S., Ed., et al., "IS-IS Extensions for Segment Routing," draft-ietf-isis-segment-routing-extensions-15, Dec. 19, 2017, 34 pages.
Dhody, D., Ed., et al., "A YANG Data Model for Path Computation Element Communications Protocol (PCEP)," draft-ietf-pce-pcep-yang-06, Jan. 5, 2018, 108 pages.
Tantsura, J., et al., "Signaling MSD (Maximum SID Depth) Using IS-IS," draft-ietf-isis-segment-routing-msd-09, Jan. 10, 2018, 9 pages.
Xu, X., et al., "Signaling Entropy Label Capability and Readable Label-stack Depth Using IS-IS," draft-ietf-isis-mpls-elc-03, Jan. 3, 2018, 6 pages.
Filsfils, C., Ed., et al., "Segment Routing Architecture," draft-ietf-spring-segment-routing-14, Dec. 20, 2017, 31 pages.
Litkowski, S., et al., "YANG Data Model for Segment Routing," draft-ietf-spring-sr-yang-08, Dec. 28, 2017, 29 pages.
Hegde, S., "Tiaflic Accounting for MPLS Segment Routing Paths," draft-hegde-spring-traffic-accounting-for-sr-paths-01, Oct. 30, 2017, 14 pages.
Chunduri, U., et al., "Preferred Path Routing (PPR) in IS-IS," draft-chunduri-lsr-isis-preferred-path-routing-01, Jul. 2, 2018, 51 pages.
Qu, Y., et al., "YANG Data Model for Preferred Path Routing," draft-qct-lsr-ppr-yang-000, Jun. 27, 2018, 56 pages.
Revidi, S., Ed., et al., "IPv6 Segment Routing Header (SRH)," draft-ietf-6man-segment-routing-header-08, Jan. 20, 2018, 35 pages.
Awduche, D., et al., "RSVP-TE: Extensions to RSVP for LSP Tunnels," RFC 3209, Dec. 2001, 57 pages.
Kompella, K., et al., "The Use of Entropy Labels in MPLS Forwarding," RFC 6790, Nov. 2012, 25 pages.
Psenak, P., et al., "OSPFv2 Prefix/Link Attribute Advertisement," RFC 7684, Nov. 2015, 15 pages.
Quinn, P., Ed., et al., "Network Service Header (NSH)," RFC 8300, Jan. 2018, 40 pages.
Bates, et al.,"Multiprotocol Extensions for BGP-4," RFC 4760, Jan. 2007, 12 pages.
Psenak, et al., "Multi-Topology (MT) Routing in OSPF," RFC 4915, Jun. 2007, 20 pages.
Przygiena, et al., "M-ISIS: Multi Topology (MT) Routing in Intermediate System to Intermediate Systems (IS-Iss)," RFC 5120 Feb. 2008, 14 pages.
Gredler, Ed., et al., "North-Bound Distribution of Link-State and Traffic Engineering (TE) Information Using BGP," RFC 7752, Mar. 2016, 48 pages.
Han, L., et al., "Ipv6 in-band signaling for the support of transport with QoS," draft-han-6man-in-band-signaling-for-transport-qos-00, Oct. 11, 2017, 40 pages.
Previdi, S., et al., "Ipv6 Segment Routing Header (SRH)," draft-ietf-6man-segment-routing-header-11, Mar. 28, 2018, 34 pages.
Filsfils, C., Ed., et al., "Segment Routing Architecture," draft-ietf-spring-segment-routing-15, Jan. 25, 2018, 31 pages.
Braden, R., Ed., et al., "Resource Reservation Protocol (RSVP)," RFC 2205, Sep. 1997, 112 pages.
Li, T., et al., "IS-IS Extensions for Traffic Engineering," RFC 5305, Oct. 2008, 17 pages.
Previdi, S., Ed., et al., "IS-IS Traffic Engineering (TE) Metric Extensions," RFC 7810, May 2016, 18 pages.
Atlas, A., Ed., et al., "Basic Specification for IP Fast Reroute: Loop-Free Alternates," RFC 5286, Sep. 2008, 31 pages.
Bryant, S., et al., "Remote Loop-Free Alternate (LFA) Fast Reroute (FRR)," RFC 7490, Apr. 2015, 29 pages.

(56) References Cited

OTHER PUBLICATIONS

Bashandy, A., et al., "Loop avoidance using Segment Routing, draft-bashandy-rtgwg-segment-routing-uloop-03," Apr. 2, 2018, 7 pages.
Bashandy, A., et al., "Topology Independent Fast Reroute using Segment Routing, draft-bashandy-rtgwg-segment-routing-ti-lfa-05," Oct. 4, 2018, 19 pages.
Sivabalan, S., et al., "PCEP Extensions for Segment Routing," draft-ietf-pce-segment-routing-11, Nov. 20, 2017, 22 pages.
Bashandy, A., et al., "Topology Independent Fast Reroute using Segment Routing," draft-bashandy-rtgwg-segment-routing-ti-lfa-04, Mar. 30, 2018, 18 pages.
Mirsky, G., et al., "Bidirectional Forwarding Detection (BFD) in Segment Routing Networks Using MPLS Dataplane," draft-mirsky-spring-bfd-05, Mar. 1, 2018, 11 pages.
Atlas, A., et al., "An Architecture for IP/LDP Fast Reroute," RFC 7812, Jun. 2016, 44 pages.
Jumar, N., Ed., et al., "Label Switched Path (LSP) Ping/Traceroute for Segment Routing (SR) IGP-Prefix and IGP-Adjacency Segment Identifiers (SIDs) with MPLS Data Planes," RFC 8287, Dec. 2017, 25 pages.

\* cited by examiner

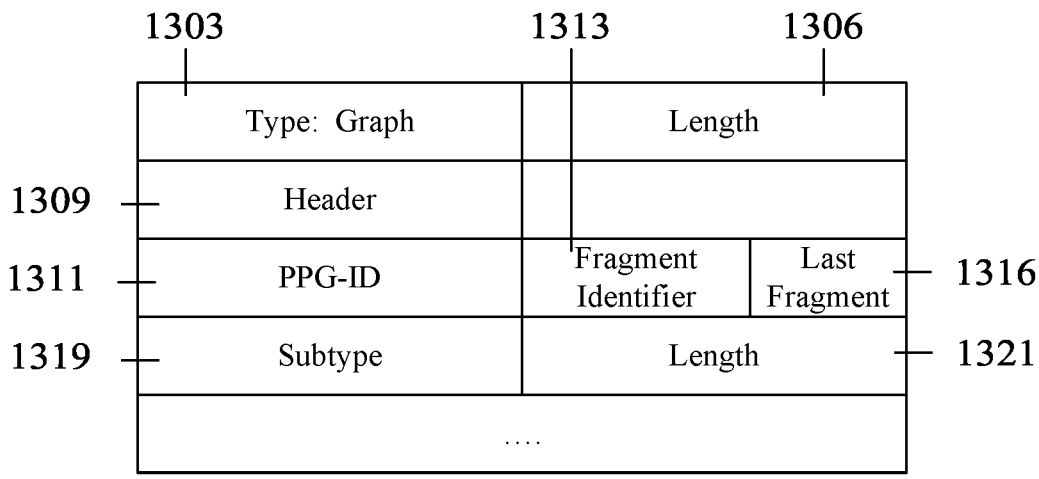
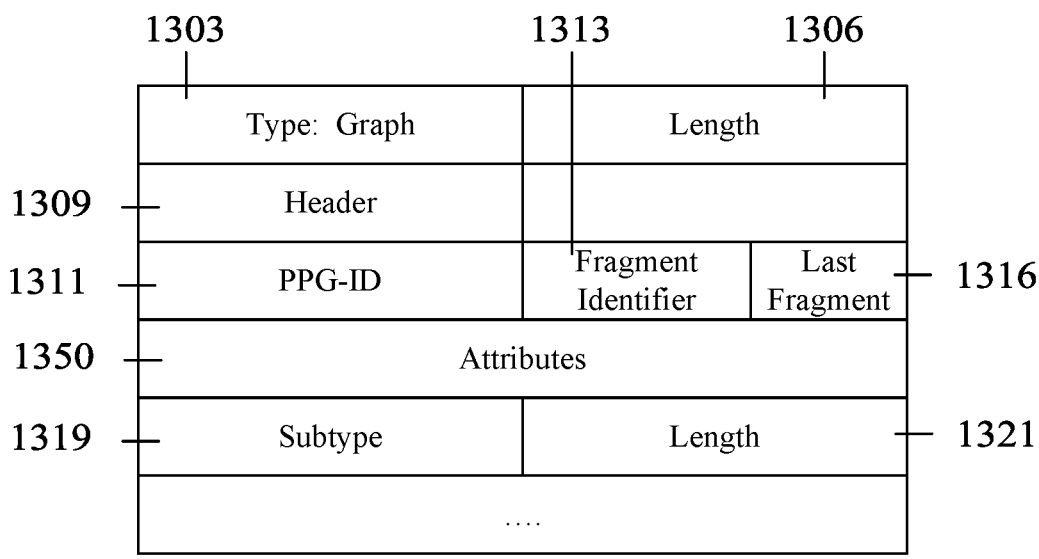
FIG. 13

1600

```
                        ( START )
                            │
                            ▼
        ┌─────────────────────────────────────────────────────┐
        │ Receive preferred path route (PPR) information      │
        │ describing a PPR graph, the PPR graph representing  │
        │ a plurality of PPRs between an ingress NE and an    │
 1603 ──│ egress NE in the network, the PPR information       │
        │ including a PPR-identifier (PPR-ID) associated      │
        │ with the egress NE and a plurality of PPR-Path      │
        │ Description Elements (PPR-PDEs) describing a        │
        │ plurality of elements included in the PPR graph, a  │
        │ PPR-PDE describing the ingress NE including a       │
        │ source flag and a PPR-PDE describing the egress NE  │
        │ including a destination flag                        │
        └─────────────────────────────────────────────────────┘
                            │
                            ▼
        ┌─────────────────────────────────────────────────────┐
        │ Update a forwarding database to include a           │
 1606 ──│ forwarding entry for the egress NE in response to   │
        │ identifying the NE in the plurality of PPR-PDEs,    │
        │ the forwarding entry indicating a next hop by which │
        │ to forward a data packet comprising the PPR-ID      │
        └─────────────────────────────────────────────────────┘
                            │
                            ▼
                        (  END  )
```

FIG. 16

PREFERRED PATH ROUTE GRAPHS IN A NETWORK

CROSS-REFERENCE TO RELATED APPLICATIONS

The present application is a continuation of International Patent Application PCT/US2019/030440 filed May 2, 2019 by Futurewei Technologies, Inc. and claims the benefit of U.S. Provisional Patent Application No. 62/680,356 filed Jun. 4, 2018 by Toerless Eckert, et al., and entitled "Preferred Path Routing (PPR) with Graph Structures," all of which are incorporated herein by reference as if reproduced in their entireties.

FIELD OF INVENTION

The present disclosure pertains to the field of preferred path routing. In particular, the present disclosure relates to establishing and provisioning preferred path route (PPR) graphs in a network, in which a PPR graph represents multiple paths from any source to any destination included in the PPR graph.

BACKGROUND

In a network implementing source routing, a controller that has knowledge of a complete topology of the underlying network can program an ingress node of the network with a custom path that certain traffic has to travel to reach a destination. This custom path may not necessarily be the shortest path between the ingress node and egress node. An ingress node in the network may use a separate flow classification technique (e.g., source and/or destination addresses or transport port numbers) to associate certain traffic flow with a custom path.

In a network implementing segment routing (SR), packets are steered through the network using segment identifiers (SIDs) that uniquely identify segments in the network. A segment may include one or more nodes, interfaces, and links between two nodes in the network. The SIDs are typically carried in the header of the packet.

Currently there are two data planes that use segment routing to provision custom paths in a network—Segment Routing (SR) Multi-Protocol Label Switching (MPLS) (SR-MPLS) and SR-Internet Protocol (IP) Version 6 (IPv6) (SR-IPv6). In SR-MPLS, each segment is encoded as a label, and an ordered list of segments are encoded as a stack of labels in the header of the packet. Similarly, in SR-IPv6, each segment is encoded as an IPv6 address within a segment routing header (SRH).

SUMMARY

According to a first aspect of the present disclosure, there is provided a method implemented by a network element NE in a network. The method comprises receiving, by the NE, preferred path route (PPR) information describing a PPR graph, the PPR graph representing a plurality of PPRs between an ingress NE and an egress NE in the network, the PPR information including a PPR-identifier (PPR-ID) associated with the egress NE and a plurality of PPR-Path Description Elements (PPR-PDEs) describing a plurality of elements included in the PPR graph, a PPR-PDE describing the ingress NE including a source flag and a PPR-PDE describing the egress NE including a destination flag, and updating, by the NE, a forwarding database to include a forwarding entry for the egress NE in response to identifying the NE in the plurality of PPR-PDEs, the forwarding entry indicating a next hop by which to forward a data packet comprising the PPR-ID.

In a first implementation of the method according to the first aspect, the PPR graph comprises a plurality of branches, wherein each branch comprises a plurality of elements on a path between two NEs included in the PPR graph.

In a second implementation of the method according to the first aspect or any preceding implementation of the first aspect, the PPR graph comprises a plurality of ingress NE and only the egress NE, wherein the PPR graph comprises a plurality branches, wherein each of the branches comprises a plurality of elements on a path connecting one of the ingress NEs to an NE along the path to the egress NE, and wherein each of the branches includes at least one common NE.

In a third implementation of the method according to the first aspect or any preceding implementation of the first aspect, the method further comprises determining, by the NE, a plurality of PPR-PDEs corresponding to each of the plurality of branches based on the PPR information, sequentially searching, by the NE, the plurality of PPR-PDEs on a first branch of the plurality of branches to determine whether the NE is identified in one of the plurality of PPR-PDEs, determining, by the NE, the egress NE of the first branch based on the destination flag in response to being identified in the one of the plurality of PPR-PDEs, and generating, by the NE, the forwarding entry for the egress NE indicating that a next hop toward the egress NE is a next PPR-PDE of the plurality of PPR-PDEs.

In a fourth implementation of the method according to the first aspect or any preceding implementation of the first aspect, the PPR graph comprises a plurality of ingress NEs and a plurality of egress NEs, wherein the PPR graph comprises a plurality branches, wherein each of the branches comprises a plurality of elements on a path connecting one of the ingress NEs to an NE along the path to one of the egress NEs, and wherein each of the branches includes at least one common NE.

In a fifth implementation of the method according to the first aspect or any preceding implementation of the first aspect, the method further comprises determining, by the NE, a plurality of PPR-PDEs corresponding to each of the plurality of branches based on the PPR information, sequentially searching, by the NE, the plurality of PPR-PDEs on a first branch of the plurality of branches to determine whether the NE is identified in one of the plurality of PPR-PDEs, determining, by the NE, a plurality of egress NEs of the first branch in response to being identified in the one of the plurality of PPR-PDEs, and generating, by the NE, a plurality of forwarding entries for the plurality of egress NEs.

In a sixth implementation of the method according to the first aspect or any preceding implementation of the first aspect, the PPR information includes a flag indicating that the PPR graph is a bidirectional forest, wherein the PPR graph comprises a plurality of ingress NEs and a plurality egress NEs, wherein the PPR graph comprises a plurality branches, wherein each of the plurality of branches comprises a plurality of elements on a bidirectional path connecting one of the ingress NEs to an NE along the bidirectional path to one of the egress NEs, and wherein each of the branches includes at least one common NE.

In a seventh implementation of the method according to the first aspect or any preceding implementation of the first aspect, the method further comprises determining, by the NE, a plurality of PPR-PDEs corresponding to each of the plurality of branches based on the PPR information, sequentially searching, by the NE, the plurality of PPR-PDEs on a first branch of the plurality of branches to determine whether the NE is identified in one of the plurality of PPR-PDEs, determining, by the NE, a first plurality of destinations along a first direction of the first branch in response to being identified in the one of the plurality of PPR-PDEs, generating, by the NE, a plurality of forwarding entries for the first plurality of destinations, determining, by the NE, a second plurality of destinations along a second direction of the first branch, and generating, by the NE, a plurality of forwarding entries for the second plurality of destinations.

In an eighth implementation of the method according to the first aspect or any preceding implementation of the first aspect, the forwarding database is not updated in response to identifying the NE in the one of the plurality of PPR-PDEs and determining that a next hop is on a different branch.

In a ninth implementation of the method according to the first aspect or any preceding implementation of the first aspect, the PPR graph comprises a single source and a single destination.

In a tenth implementation of the method according to the first aspect or any preceding implementation of the first aspect, the PPR information describing the PPR graph is received from a central entity of the network or an administrator of the network.

In an eleventh implementation of the method according to the first aspect or any preceding implementation of the first aspect, the PPR information is transmitted to a plurality of other NEs in the network.

In a twelfth implementation of the method according to the first aspect or any preceding implementation of the first aspect, the forwarding entry comprises an address prefix indicating the next hop, wherein the address prefix represents a plurality of NEs along a branch of the PPR graph.

In a thirteenth implementation of the method according to the first aspect or any preceding implementation of the first aspect, a first PPR-PDE on a branch of the PPR graph includes a flag indicating that the branch is cyclical.

In a fourteenth implementation of the method according to the first aspect or any preceding implementation of the first aspect, the PPR information includes a type field indicating that the plurality of PPR-PDEs describes a tree, a forest, or a bidirectional forest.

In a fifteenth implementation of the method according to the first aspect or any preceding implementation of the first aspect, the PPR graph comprises a plurality of ingress NEs and a plurality of egress NEs, wherein each of the plurality of egress NEs is represented by a different PPR-ID, and wherein a forwarding entry is created for each of the plurality of egress NEs.

In a sixteenth implementation of the method according to the first aspect or any preceding implementation of the first aspect, the PPR information includes a policy group tag associated with one or more PPR graphs, wherein the one or more PPR graphs are assigned the policy group tag based on an attribute associated with the one or more PPR graphs, wherein the attribute is at least one of a traffic engineering (TE) parameter, network characteristic, or service requirement that is associated with a resource to be reserved on each of one or more PPR graphs.

In a seventeenth implementation of the method according to the first aspect or any preceding implementation of the first aspect, the PPR information is received from another NE in the network as a plurality of fragments, wherein each fragment includes a PPR graph identifier (PPG-ID), a fragment identifier, a last fragment flag, and a subset of the plurality of PPR-PDEs, wherein the PPG-ID identifies the PPR graph described by the PPR information, wherein the fragment identifier indicates a sequence number of a respective fragment, and wherein the last fragment flag indicates whether the respective fragment is a last fragment representing the PPR graph of the plurality of fragments.

In an eighteenth implementation of the method according to the first aspect or any preceding implementation of the first aspect, the forwarding entry is generated based on the plurality of fragments after the respective fragment having the last fragment flag set is received.

According to a second aspect of the present disclosure, there is provided a method implemented by a central entity in a network. The method comprises determining, by the central entity, preferred path route (PPR) information describing a PPR graph, the PPR graph representing a plurality of PPRs between an ingress network entity (NE) and an egress NE in the network, the PPR information including a PPR-identifier (PPR-ID) associated with the egress NE and a plurality of PPR-Path Description Elements (PPR-PDEs) describing a plurality of elements included in the PPR graph, a PPR-PDE describing the ingress NE including a source flag, and a PPR-PDE describing the egress NE including a destination flag, and transmitting, by the central entity, the PPR information describing the PPR graph to a headend NE of the network.

According to a third aspect of the present disclosure, there is provided a NE implemented in a network. The NE comprises a memory configured to store instructions, and a processor coupled to the memory and configured to execute the instructions to cause the processor to be configured to receive preferred path route (PPR) information describing a PPR graph, the PPR graph representing a plurality of PPRs between an ingress NE and an egress NE in the network, the PPR information including a PPR-identifier (PPR-ID) associated with the egress NE and a plurality of PPR-Path Description Elements (PPR-PDEs) describing a plurality of elements included in the PPR graph, a PPR-PDE describing the ingress NE including a source flag and a PPR-PDE describing the egress NE including a destination flag, and update a forwarding database to include a forwarding entry for the egress NE in response to identifying the NE in the plurality of PPR-PDEs, the forwarding entry indicating a next hop by which to forward a data packet comprising the PPR-ID.

According to a fourth aspect of the present disclosure, there is provided a central entity implemented in a network. The NE comprises a memory configured to store instructions, and a processor coupled to the memory and configured to execute the instructions to cause the processor to be configured to determine preferred path route (PPR) information describing a PPR graph, the PPR graph representing a plurality of PPRs between an ingress network entity (NE) and an egress NE in the network, the PPR information including a PPR-identifier (PPR-ID) associated with the egress NE and a plurality of PPR-Path Description Elements (PPR-PDEs) describing a plurality of elements included in the PPR graph, a PPR-PDE describing the ingress NE including a source flag, and a PPR-PDE describing the egress NE including a destination flag, and transmit the PPR information describing the PPR graph to a headend NE of the network.

According to a fifth aspect of the present disclosure, there is provided an apparatus comprising a means for receiving preferred path route (PPR) information describing a PPR graph, the PPR graph representing a plurality of PPRs between an ingress NE and an egress NE in the network, the PPR information including a PPR-identifier (PPR-ID) associated with the egress NE and a plurality of PPR-Path Description Elements (PPR-PDEs) describing a plurality of elements included in the PPR graph, a PPR-PDE describing the ingress NE including a source flag and a PPR-PDE describing the egress NE including a destination flag, and a means for updating a forwarding database to include a forwarding entry for the egress NE in response to identifying the NE in the plurality of PPR-PDEs, the forwarding entry indicating a next hop by which to forward a data packet comprising the PPR-ID.

According to a sixth aspect of the present disclosure, there is provided an apparatus comprising a means for determining preferred path route (PPR) information describing a PPR graph, the PPR graph representing a plurality of PPRs between an ingress network entity (NE) and an egress NE in the network, the PPR information including a PPR-identifier (PPR-ID) associated with the egress NE and a plurality of PPR-Path Description Elements (PPR-PDEs) describing a plurality of elements included in the PPR graph, a PPR-PDE describing the ingress NE including a source flag, and a PPR-PDE describing the egress NE including a destination flag, and a means for transmitting the PPR information describing the PPR graph to a headend NE of the network.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 13 is a diagram illustrating fragments used to carry PPR information for a PPR graph according to various embodiments of the disclosure.

FIGS. 15-16 are flowcharts illustrating methods for advertising and programming PPR graphs according to various embodiments of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
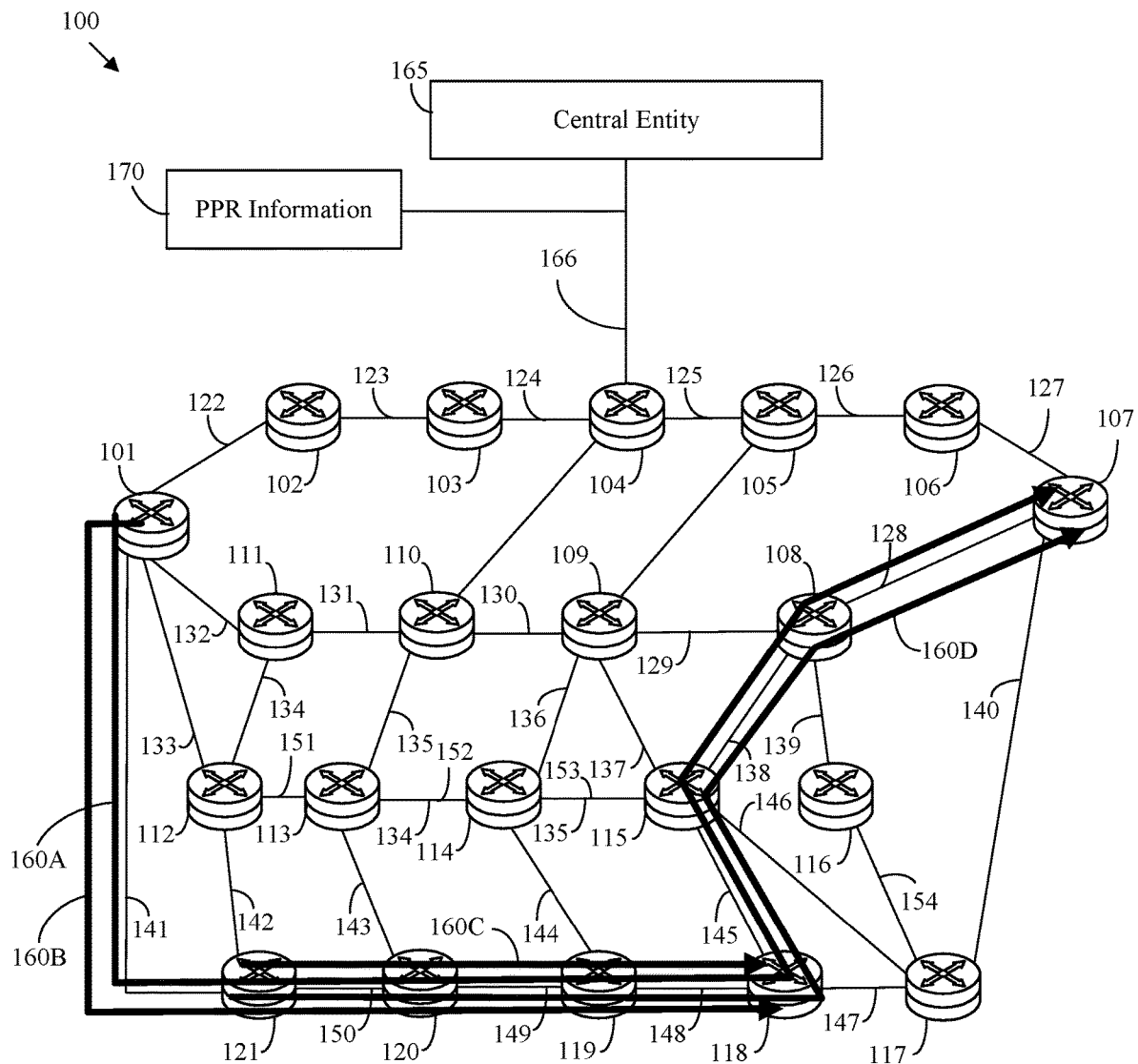
FIG. 1A is a diagram illustrating a network configured to implement preferred path routing.

FIG. 1A is a diagram illustrating a network 100 (also referred to herein as a "domain or "subnetwork") configured to implement preferred path routing. The network 100 comprises a central entity 165 (also referred to herein as a "controller") and multiple network entities (NEs) 101-121. The NEs 101-121 are interconnected via links 122-154. The central entity 165 is connected to one of the NEs 104 via a central entity-to-domain link 166.

In an embodiment, the central entity 165 may be a network or domain controller that maintains a topology of the network 100 to craft paths (shortest paths, PPRs, and PPR graphs) between edge NEs 101-121 in the network 100, as will be further described below. In an embodiment, the central entity 165 is substantially similar to a Path Computation Element (PCE), which is further described in Internet Engineering Task Force (IETF) Request for Comments (RFC) 8281, entitled "Path Computation Element Communication Protocol (PCEP) Extensions for PCE-Initiated LSP Setup in a Stateful PCE Model," by E. Crabbe, dated December 2017, which is hereby incorporated by reference in its entirety. In an embodiment, the central entity 165 may be substantially similar to a Software Defined Network Controller (SDNC), which is further described in the IETF RFC 8402 entitled "Segment Routing Architecture," by C. Filsfils, dated July 2018, which is hereby incorporated by reference in its entirety. In an embodiment, the central entity 165 may be substantially similar to an Application Layer Traffic Optimization (ALTO) server, which is further described in the IETF RFC 7285, entitled "Application Layer Traffic Optimization (ALTO) Protocol," by R. Alimi, dated September 2014, which is hereby incorporated by reference in its entirety.

In an embodiment, NEs 101-121 (also referred to herein as "nodes") may be a topological devices (or physical devices) such as a router, a bridge, a network switch, or a logical device configured to perform switching and routing using the preferred path routing mechanisms disclosed herein. In an embodiment, one or more of the NEs 101-121 may be non-topological NEs such as, for example, a function, context, service, or a virtual machine. A non-topological NE may be implemented by the NEs 101-121 or implemented by another device attached to the NEs 101-121.

In an embodiment, NEs 101-121 may be headend nodes or edge nodes positioned at an edge of the network 100. While NEs 101-121 are shown in FIG. 1A as headend nodes, it should be appreciated that NEs 101-121 may otherwise be an intermediate node or any other type of NE. Although only twenty one NEs 101-121 are shown in FIG. 1A, it should be appreciated that the network 100 shown in FIG. 1A may include any number of NEs. In an embodiment, the central entity 165 and NEs 101-121 are configured to implement various packet forwarding protocols, such as, but not limited to, Multi-Protocol Label Switching (MPLS), Segment Routing-MPLS (SR-MPLS), Internet Protocol (IP) Version 4 (IPv4), IP Version 6 (IPv-6), Next Generation Explicit Routing (NGER), or any future packet forwarding protocol.

The links 122-154 may be wired links, wireless links, or interfaces interconnecting the NEs 101-121 together. Similarly, the central entity-to-domain link 166 is a wired link, wireless link, or interfaces interconnecting at least one of the NEs 101-121 to the central entity 165.

In operation, the central entity 165 is configured to determine one or more shortest paths between two edge NEs 101-121 in the network 100 and one or more PPRs 160A-D between different edge NEs 101-121 in the network 100. A shortest path refers to a path between two NEs 101-121 that is determined based on a metric, such as, for example, a cost or weight associated with each link on the path, a number of NEs on the path, a number of links on the path, etc. In an embodiment, a shortest path may be computed for a destination using a Dijkstra's Shortest Path First (SPF) algorithm.

A PPR 160A-D (also referred to herein as a "Non-Shortest Path" (NSP)) refers to a custom path or any other path that is determined based on an application or server request for a path between an ingress NE 101-121 and an egress NE 101-121 (or between a source and destination). In an embodiment, the PPR 160A-D deviates from the shortest path. However, the PPR 160A-D may also be the same as the shortest path in some circumstances. The PPR 160A-D includes a sequential ordering of elements 121-154 (e.g., NEs 101-121 and/or links 122-154) along a path in the network 100.

In an embodiment, the central entity 165 determines the PPRs 160A-D based on a network topology of network 100, which is maintained at the central entity 165. In this embodiment, the central entity 165 generates PPR information 170, describing each of the PPRs 160A-D, and sends the PPR information 170 to an NE 104 via the central entity-to-domain link 166.

As will be further described below, the PPR information 170 may include details regarding each of the PPRs 160A-D, such as, for example, a PPR-identifier (PPR-ID) of each PPR 160A-D, attributes associated with resources to be reserved on each PPR 160A-D, and multiple PPR-path description elements (PPR-PDEs) describing one or more elements on each PPR 160A-D. In this embodiment, NE 104 floods the PPR information 170 to the remaining NEs 101-103 and 105-121 in the network 100 using the underlying Interior Gateway Protocol (IGP) of the network 100. For example, NE 104 transmits the PPR information 170 to neighboring NEs 103 and 105. NE 103 forwards the PPR information 170 to neighboring NE 102, and NE 105 forwards the PPR information 170 to neighboring NE 106. In this way, the remaining NEs 101-103 and 105-121 continue to forward the PPR information 170 to all the remaining NEs 101-103 and 105-121 in the network 100. The IGP implemented by the network 100 may be Open Shortest Path First (OSPF) Version 2 (OSPFv2), OSPF Version 3 (OSPFv3), Intermediate System-Intermediate System (IS-IS), or direct SDN.

In another embodiment, an operator or administrator of the network 100 may determine the PPRs 160A-D and send the PPR information 170 describing the PPRs 160A-D to one of the NEs 101-121 in the network 100. The PPR information 170 may then be flooded to all the remaining NEs 101-121 in the network 100.

After receiving the PPR information 170, each of the NEs 101-121 is configured to determine whether the respective NE 101-121 is identified in the PPR information 170 describing one or more of the PPRs 160A-D. If so, then the respective NE 101-121 updates the local forwarding database by adding a forwarding entry defining a next hop for a particular destination or egress NE identified by the PPR information 170. If not, then the respective NE 101-121 ignores the PPR information 170.

In a network 100 implementing preferred path routing, a separate PPR 160A-D is determined and provisioned for each ingress and egress NE 101-121 pair. As shown by FIG. 1A, PPR 160A is a path provisioned between ingress NE 101 and egress NE 107. PPR 160A includes the following elements: ingress NE 101, link 141, NE 121, link 150, NE 120, link 149, NE 119, link 148, NE 118, link 145, NE 115, link 138, NE 108, link 128, and egress NE 107. PPR 160B is a path provisioned between ingress NE 101 and egress NE 118. PPR 160B includes the following elements: ingress NE 101, link 141, NE 121, link 150, NE 120, link 149, NE 119, link 148, and NE 118. PPR 160C is a path provisioned between ingress NE 121 and egress NE 118. PPR 160C includes the following elements: ingress NE 121, link 150, NE 120, link 149, NE 119, link 148, and NE 118. PPR 160D is a path provisioned between ingress NE 121 and egress NE 107. PPR 160D includes the following elements: ingress NE 121, link 150, NE 120, link 149, NE 119, link 148, NE 118, link 145, NE 115, link 138, NE 108, link 128, and egress NE 107.

In this case, the central entity 165 or an administrator of the network 100 generates the PPR information 170 to include details regarding each of PPRs 160A-D and each of the elements on each of PPRs 160A-D. For example, a separate PPR-ID is determined for each of the PPRs 160A-D, and a separate PPR-PDE is created for one or more of the elements on each of the PPRs 160A-D. This PPR information 170 is flooded through the network 100 using the underlying IGP of the network such that one more of NEs 101-121 in network 100 stores the PPR information 170.

Therefore, to provision PPRs 160A-D in network 100, PPR information 170 for each of the PPRs 160A-D has to be created, flooded through the network 100, and stored at one or more of the NEs 101-121. This creates a scalability issue across the network 100, in that the amount of PPR information 170 that has to be created, forwarded, and stored is extensive when there is a large number of PPRs 160A-D to be provisioned in the network 100.

Disclosed herein are embodiments directed to creating PPR graphs that represent a plurality of PPRs 160A-D between one or more ingress NEs 101-121 and one or more egress NEs 101-121 in the network 100. Instead of creating PPR information 170 for each PPR 160A-D in a network 100, the PPR information 170 describes PPR graphs, as disclosed herein. The PPR graphs include flags or bits to indicate whether an NE 101-121 is an ingress NE 101-121 or an egress NE 101-121. In this way, the amount of PPR information 170 that has to be created, forwarded, and stored across the network 100 is dramatically decreased. Therefore, the embodiments disclosed herein enable PPRs 160A-D to be provisioned in a more resource efficient manner that saves computing resources and network resources.

Figure 1B:
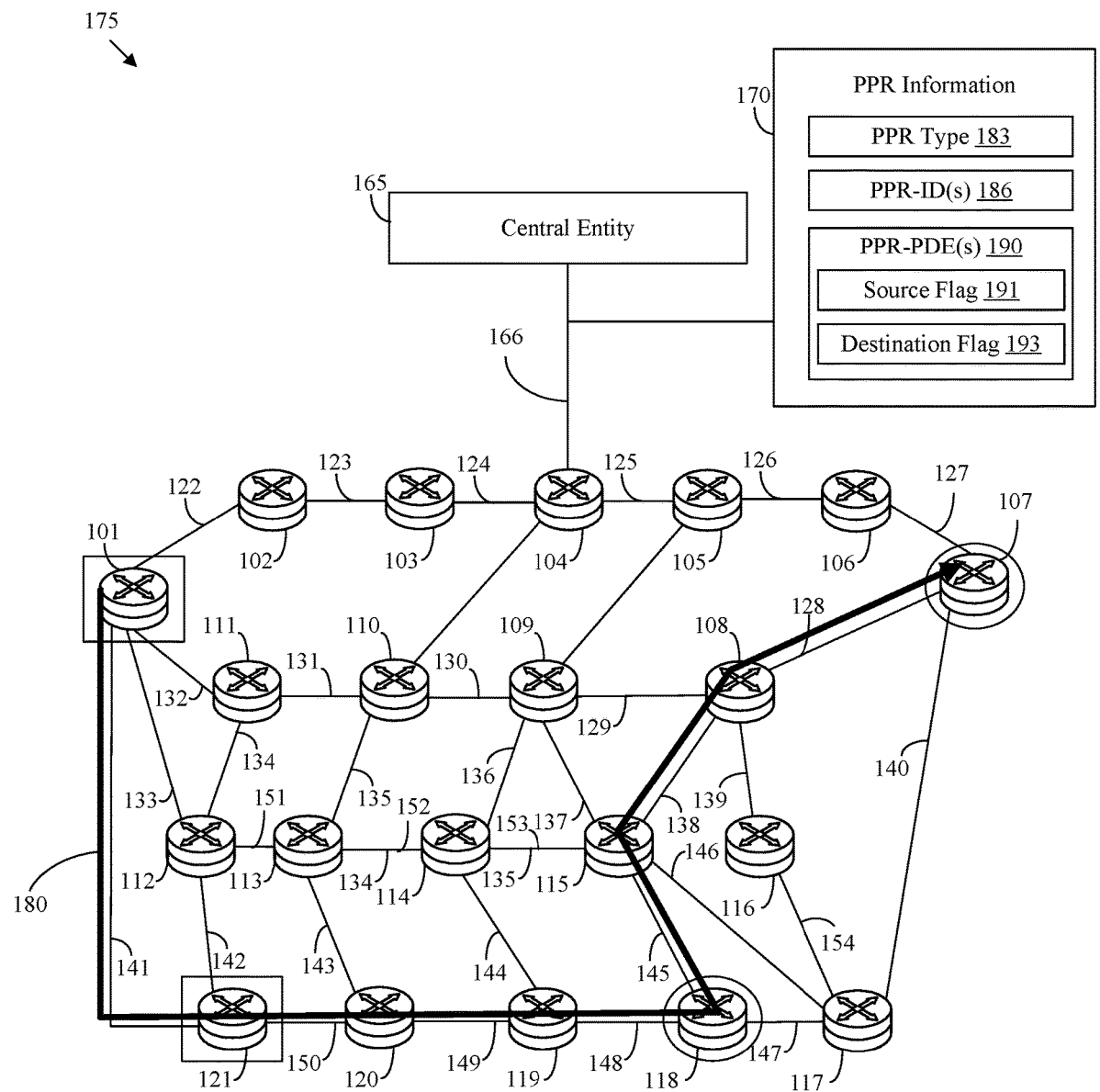
FIG. 1B is a diagram illustrating a network configured to implement preferred path routing and PPR graphs according to various embodiments of the disclosure.

FIG. 1B is a diagram illustrating a network 175 configured to implement preferred path routing and PPR graphs 180 according to various embodiments of the disclosure. Network 175 is similar to network 100, except that network 175 is configured to provision a single PPR graph 180, instead of multiple PPRs 160A-D. In an embodiment, a PPR graph 180 represents multiple PPRs 160A-D between one or more ingress NEs 101-121 (also referred to herein as "sources") and one or more egress NEs 101-121 (also referred to herein as "destinations").

As shown by FIG. 1B, the PPR graph 180 includes the following elements: NE 101, link 141, NE 121, link 150, NE 120, link 149, NE 119, link 148, NE 118, link 145, NE 115, link 138, NE 108, link 128, and NE 107. PPR graph 180 includes two ingress NEs 101 and 121 and two egress NEs 118 and 108. The ingress NEs 101 and 121 are represented in FIG. 1B with rectangles around NEs 101 and 121, and the egress NEs 118 and 107 are represented in FIG. 1B with circles around NEs 118 and 107.

In an embodiment, the PPR graph 180 represents multiple possible paths between the ingress NEs 101 and 121 and the egress NEs 119 and 108. For example, as shown in FIG. 1B, PPR graph 180 includes all of the elements from PPR 160A (FIG. 1A): ingress NE 101, link 141, NE 121, link 150, NE 120, link 149, NE 119, link 148, NE 118, link 145, NE 115, link 138, NE 108, link 128, and egress NE 107. PPR graph 180 also includes all of the elements from PPR 160B (FIG. 1A): ingress NE 101, link 141, NE 121, link 150, NE 120, link 149, NE 119, link 148, and NE 118. Similarly, PPR graph 180 includes all of the elements from PPR 160C (FIG. 1A): ingress NE 121, link 150, NE 120, link 149, NE 119, link 148, and NE 118. Finally, PPR graph 180 includes all of the elements from PPR 160D (FIG. 1A): ingress NE 121, link 150, NE 120, link 149, NE 119, link 148, NE 118, link 145, NE 115, link 138, NE 108, link 128, and egress NE 107. In this embodiment, the PPR graph 180 includes a PPR 160A between ingress NE 101 and egress NE 107, a PPR 160B between ingress NE 101 and egress NE 118, a PPR 160C between ingress NE 121 and egress NE 118, and a PPR 160D between ingress NE 121 and egress NE 107. Therefore, in various embodiments, a PPR graph 180 includes a plurality of different PPRs 160A-D, having different ingress NEs 101 and 121 and different egress NEs 118 and 107.

In an embodiment, the central entity 165 or a network administrator determines the PPR graph 180 based on a network topology of network 175 maintained at the central entity 165 and based on a network resource to be reserved for the PPR graph 180. In an embodiment, the central entity 165 or the network administrator generates PPR information 170 describing the PPR graph 180 and sends the PPR information 170 to a headend NE 104 in network 175 via central entity-to-domain link 166.

As shown by FIG. 1B, the PPR information 170 includes a PPR type 183, one or more PPR-IDs 186, and one or more PPR-PDEs 190. The PPR type 183 indicates a type of PPR graph 180. The different types of PPR graphs 180 will be further described below with reference to FIGS. 4-10. The one or more PPR-IDs 186 includes information identifying various paths within the PPR graph 180. In an embodiment, each of the PPR-IDs 186 includes an address, label, or identifier of each egress NE 118 and 107 included in the PPR graph 180.

The PPR-PDEs 190 include information identifying one or more elements (e.g., NE 101, link 141, NE 121, link 150, NE 120, link 149, NE 119, link 148, NE 118, link 145, NE 115, link 138, NE 108, link 128, and NE 107) on the PPR graph 180. In an embodiment, each of PPR-PDEs 190 includes a label, address, or identifier of one or more of the elements 101-154 (e.g., NEs 101-121 and links 122-154) on the PPR graph 180. In an embodiment, each of the PPR-PDEs 190 includes several flags, such as a source flag 191 and a destination flag 193. The source flag 191 may be a bit that, when set, indicates that the element 101-154 identified by the PPR-PDE 190 is an ingress NE 101 or 121 on the PPR graph 180. The destination flag 193 is also a bit that, when set, indicates that the element 101-154 identified by the PPR-PDE 190 is an egress NE 118 or 107.

According to various embodiments, transmitting the PPR information 170 describing a single PPR graph 180, which includes all four PPRs 160A-D, instead of separately transmitting PPR information 170 describing multiple PPRs 160A-D, is a more efficient and effective manner of communicating data regarding multiple different PPRs 160A-D in a network 175. In addition, the amount of data that each of the NEs 101-121 processes and stores is reduced due to the consolidated nature of the PPR information 170 describing multiple PPRs 160A-D. Therefore, the use of PPR graphs 180 enables NEs 101-121 in a network 175 to be more efficiently programmed to forward traffic according to various the PPR graphs 180.

Figure 2:
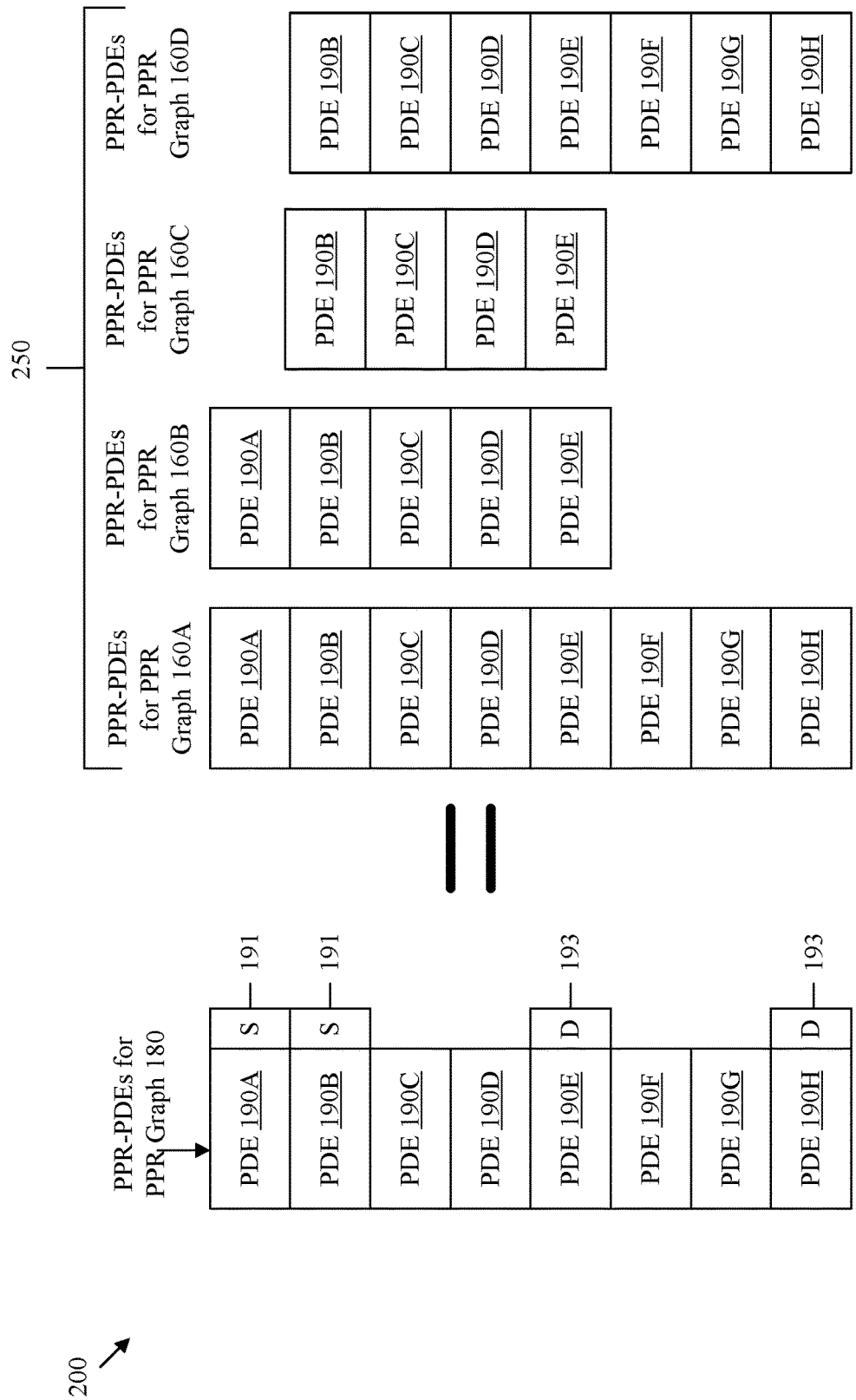
FIG. 2 is a diagram illustrating the PPR path description elements (PPR-PDEs) describing elements on the PPR graph of FIG. 1B according to various embodiments of the disclosure.

FIG. 2 is a diagram 200 illustrating the PPR-PDEs 190A-H describing elements on the PPR graph 180 of FIG. 1B, which is included in the PPR information 170, according to various embodiments of the disclosure. In an embodiment, PPR-PDEs 190A-H describe one or more of the elements (e.g., NE 101, link 141, NE 121, link 150, NE 120, link 149, NE 119, link 148, NE 118, link 145, NE 115, link 138, NE 108, link 128, and NE 107) on the PPR graph 180.

In the example shown in FIG. 2, PPR-PDE 190A includes details regarding NE 101, such as a label, address, or identifier of NE 101. PPR PDE 190A also includes the source flag 191 set to indicate that NE 101 is an ingress NE 101 of the PPR graph 180. An ingress NE 101 is configured to be a source of traffic, or receive traffic from sources external to the network 175, and forward the traffic through the network 175 using the PPR graph 180. PPR-PDE 190B includes details regarding NE 121, such as a label, address, or identifier of NE 121. PPR-PDE 190C also includes the source flag 191 set to indicate that NE 121 is also an ingress NE 121 of the PPR graph 180.

PPR-PDE 190C includes details regarding NE 120, and PPR-PDE 190D includes details regarding NE 119. PPR-PDE 190E includes details regarding NE 118, and includes the destination flag 193, which is set to indicate that NE 118 is an egress NE 118 of the PPR graph 180. This means that NE 118 is a destination on the PPR graph 180 and configured to forward traffic outside of the network 175, to another network, or to another entity. PPR-PDE 190F includes details regarding NE 115, and PPR-PDE 190G includes details regarding NE 108. PPR-PDE 190H includes details regarding NE 107, and includes the destination flag 193, which again means that the egress NE 107 is a destination on the PPR graph.

Information 250 shown to the right of diagram 200 shows the PPR-PDEs 190A-H for the four different PPRs 160A-D shown in FIG. 1A, each of which would have had to be forwarded through the network 100, and some of which would have had to be locally stored at one or more NEs 101-121. However, the PPR-PDEs 190A-H including the source flags 191 and destination flags 193 essentially include all of the information 250 shown to the right of diagram 200, in a much more compact and efficient data structure. Therefore, data that is transmitted through the network 175 to provision PPRs is reduced and the amount of computing resources needed to process the data is also reduced.

Figure 3:
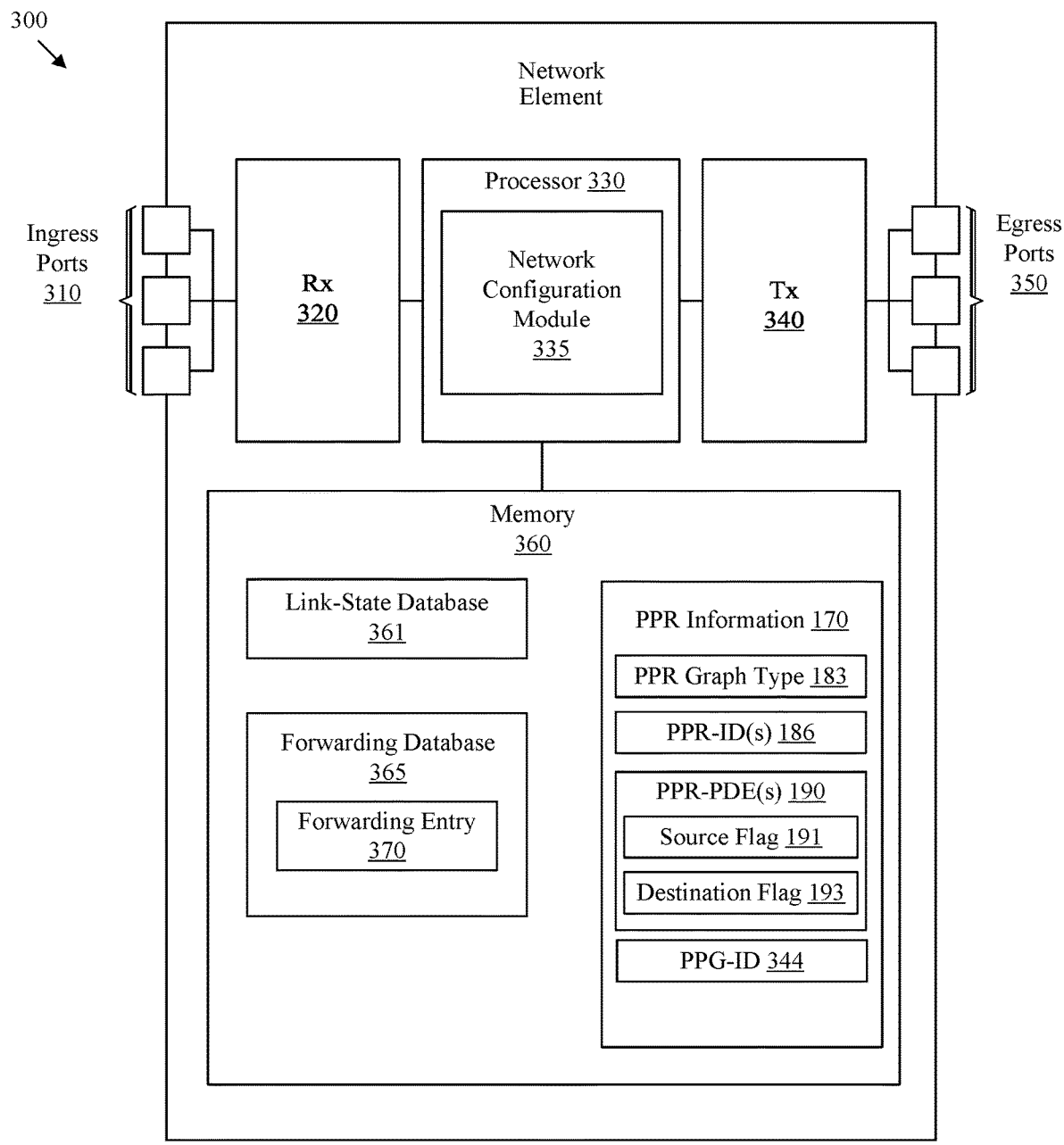
FIG. 3 is an embodiment of an NE in the network configured to implement preferred path routing and PPR graphs according to various embodiments of the disclosure.

FIG. 3 is a diagram of an embodiment of an NE 300 in a network such as networks 100 and 175. NE 300 may be implemented as the central entity 165 or the NEs 101-121. The NE 300 may be configured to implement and/or support the routing and PPR graph 180 provisioning mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. While NE 300 is described as a physical device, such as a router or gateway, the NE 300 may also be a virtual device implemented as a router or gateway running on a server or a generic routing hardware (whitebox).

The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as a NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, transmitter unit (Tx) 340 and one or more egress ports 350 for transmitting the data, and a memory 360 for storing the data.

The processor 330 may comprise one or more multi-core processors and be coupled to a memory 360, which may function as data stores, buffers, etc. The processor 330 may be implemented as a general processor or may be part of one or more application specific integrated circuits (ASICs) and/or digital signal processors (DSPs). The processor 330 may comprise a network configuration module 335, which may perform processing functions of the central entity 165 or the NEs 101-121. The network configuration module 335 may also be configured to perform the steps of methods 700, 1500, and 1600, and/or any other method discussed herein. As such, the inclusion of the network configuration module 335 and associated methods and systems provide improvements to the functionality of the NE 300. Further, the network configuration module 335 effects a transformation of a particular article (e.g., the network) to a different state. In an alternative embodiment, network configuration module 335 may be implemented as instructions stored in the memory 360, which may be executed by the processor 330.

The memory 360 may comprise a cache for temporarily storing content, e.g., a random-access memory (RAM). Additionally, the memory 360 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 360 may be configured to store the PPR information 170, which includes the PPR type 183, PPR-IDs 186, and PPR-PDEs 190A-H (hereinafter referred to as "PPR-PDE 190"), which also include source flags 191 and destination flags 193. The PPR information 170 may also include a PPR graph identifier (PPG-ID) 344, which may be a label, address, or identifier uniquely identifying the PPR graph 180. In addition, the memory 360 is configured to store a forwarding database 365 and a link state database 361. In an embodiment, the forwarding database 365 stores forwarding entries 370 describing forwarding rules for how a particular NE 300 (e.g., NE 101-121 of FIGS. 1-2) should forward a data packet that includes a PPR-ID 186 and/or a destination address.

It is understood that by programming and/or loading executable instructions onto the NE 300, at least one of the processor 330 and/or memory 360 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus. In some embodiments, the NE 300 may be configured to implement OSPFv2, OSPFv3, IS-IS, or direct SDN controller based on network implementations.

Figure 4:
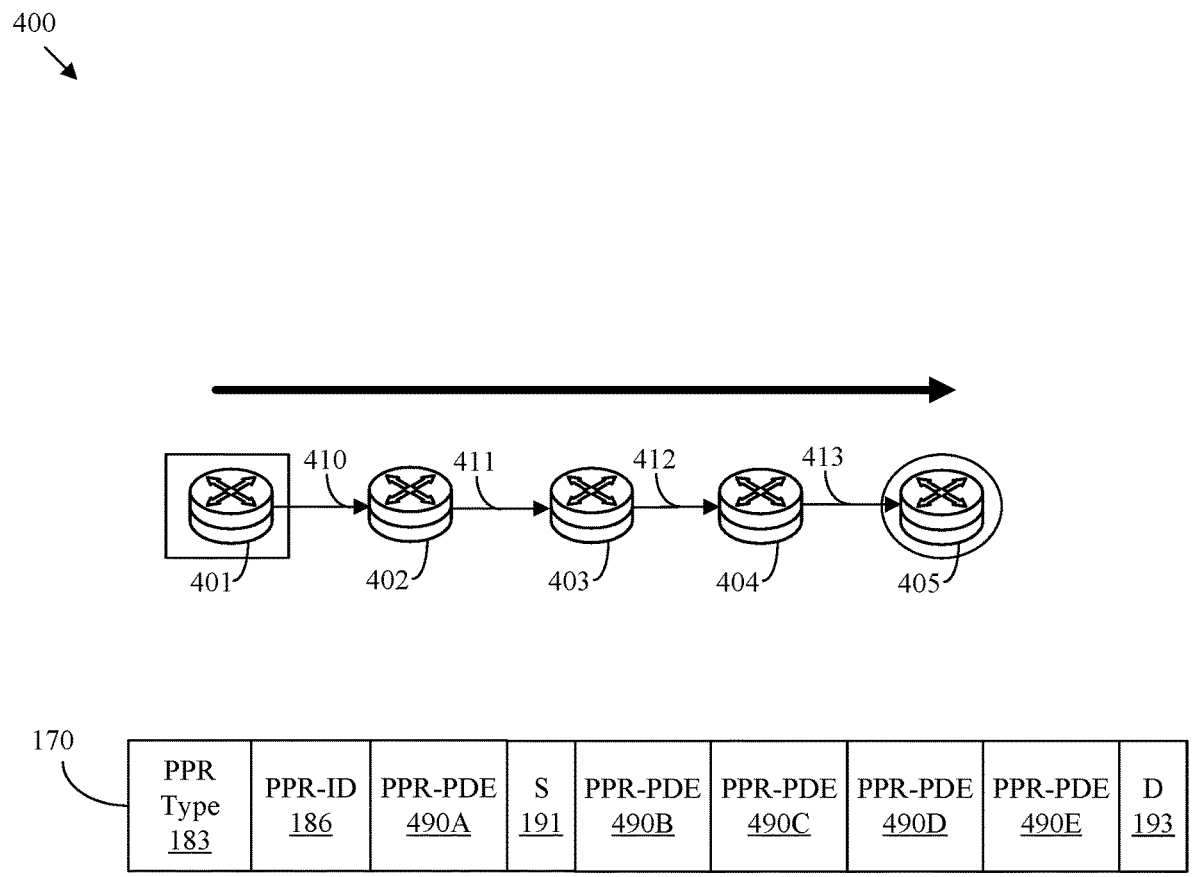
FIG. 4 is a diagram illustrating a PPR graph implemented similar to a standard PPR according to various embodiments of the disclosure.

FIG. 4 is a diagram illustrating a PPR graph 400 configured to replace the standard PPR 160A-D (collectively referred to as PPR 160) according to various embodiments of the disclosure. In an embodiment, the PPR graph 400 is similar to PPR graph 180, in that the PPR graph 400 includes at least one path between at least one ingress NE 401 and at least one egress NE 405. As shown by FIG. 4, the PPR graph 400 includes NEs 401, 402, 403, 404, and 405, each of which are similar to NEs 101-121 of FIGS. 1A-B. NEs 401-405 are interconnected by links 410-413, which are similar to links 122-154 of FIGS. 1A-B.

PPR graph 400 only includes one ingress NE 401, which is the source of the PPR graph 400 identified by a rectangle surrounding NE 401. PPR graph 400 also only includes one egress NE 405, which is a destination of the PPR graph 400 identified by a circle surrounding NE 405.

In an embodiment, the PPR information 170 representing PPR graph 400 includes a PPR type 183, a PPR-ID 186, and five PPR-PDEs 490A-E. In an embodiment, the PPR type

183 includes a value identifying that the PPR graph 400 represents a standard PPR 160 with one ingress NE 401 and one egress NE 405. In an embodiment, the PPR-ID 186 includes an identifier of PPR graph 400, such as, for example, a label, address, or identifier representing the egress NE 405. PPR-PDEs 490A-E are similar to the PPR-PDEs 190, in that PPR-PDEs 490A-E describe one or more elements on the PPR graph 400. Each of the PPR-PDEs 490A-E includes information describing NEs 401-405, respectively. For example, each of the PPR-PDEs 490A-E includes a label, address, or identifier identifying the NEs 401-405, respectively. The PPR-PDE 490A describing NE 401 includes the source flag 191 that is set to indicate that NE 401 is an ingress NE 401. The PPR-PDE 490E describing NE 405 includes the destination flag 193 that is set to indicate that NE 405 is an egress NE 405.

Figure 5:
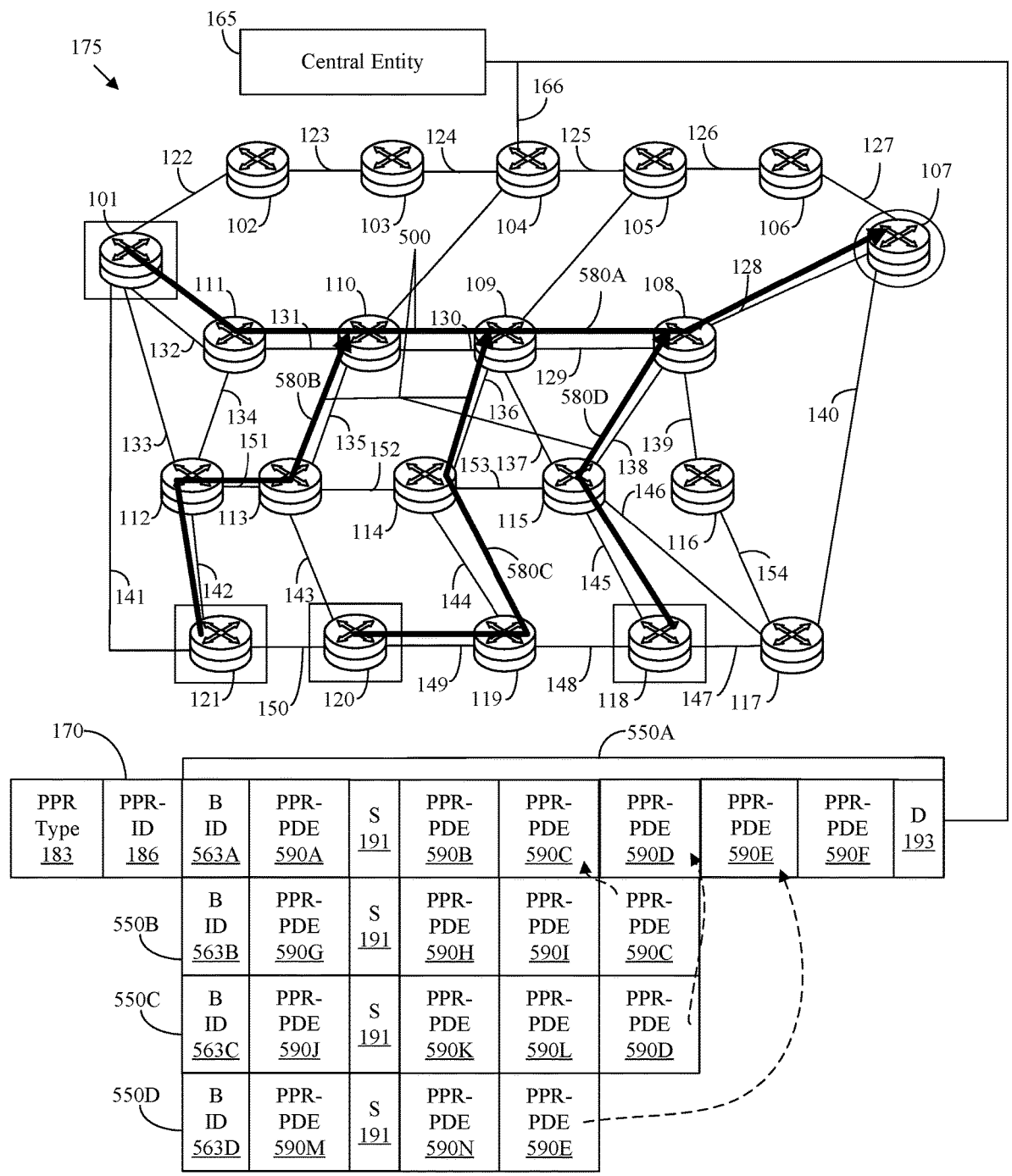
FIG. 5 is a diagram illustrating a PPR graph in the network of FIG. 1B according to various embodiments of the disclosure.

FIG. 5 is a diagram illustrating a PPR graph 500 in network 175 according to various embodiments of the disclosure. Similar to FIG. 1B, network 175 in FIG. 5 includes NEs 101-121 interconnected by links 122-154.

PPR graph 500 is similar to PPR graphs 180 and 400, in that the PPR graph 500 includes multiple paths between multiple ingress NEs 101, 121, 120, and 118 (also referred to as source NEs) and at least one egress NE 107 (also referred to as a destination NE). The PPR graph 500 shown in FIG. 5 is implemented as a PPR tree, which includes multiple ingress NEs 101, 121, 120, and 118, but only a single egress NE 107. As shown by FIG. 5, the ingress NEs 101, 121, 120, and 118 are represented with rectangles, and the single egress NE 107 is represented with a circle.

PPR graph 500 includes one or more branches 580A-D, each of which includes a sequence of elements in the network 175 connecting one of the ingress NEs 101, 121, 120, and 118 to another NE in the PPR graph 500. Each of the paths between the multiple ingress NEs 101, 121, 120, and 118 and the single egress NE 107 is represented by one of branches 580A-E. In an embodiment, each branch 580A-D shares at least one common NE.

As shown by FIG. 5, PPR graph 500 includes four branches 580A-D. The first branch 580A includes the following elements: ingress NE 101, link 132, NE 111, link 131, NE 110, link 130, NE 108, link 129, NE 108, link 128, and egress NE 107. The second branch 580B includes the following elements: ingress NE 121, link 142, NE 112, link 151, NE 113, link 135, and NE 110. In this case, the second branch 580B interconnects with the first branch 580A at NE 110, and thus, the first branch 580A and the second branch 580B share a common NE 110. In this embodiment, traffic originating from ingress NE 121 can reach egress NE 107 by being forwarded through the second branch 580B until the traffic reaches NE 110. In an embodiment, NE 110 continues to forward the traffic along the first branch 580A until the traffic reaches egress NE 107.

The third branch 580C includes the following elements: ingress NE 120, link 149, NE 119, link 144, NE 114, link 136, and NE 109. In this case, the third branch 580C interconnects with the first branch 580A at NE 109, and thus, the first branch 580A and the third branch 580C share a common NE 109. In this embodiment, traffic originating from ingress NE 120 can reach egress NE 107 by being forwarded through the third branch 580C until the traffic reaches NE 109. In an embodiment, NE 109 continues to forward the traffic along the first branch 580A until the traffic reaches egress NE 107.

The fourth branch 580D includes the following elements: ingress NE 118, link 145, NE 115, link 138, and NE 108. In this case, the fourth branch 580D interconnects with the first branch 580A at NE 108, and thus, the first branch 580A and the fourth branch 580D share a common NE 108. In this embodiment, traffic originating from ingress NE 118 can reach egress NE 107 by being forwarded through the fourth branch 580D until the traffic reaches NE 108. In an embodiment, NE 108 continues to forward the traffic along the first branch 580A until the traffic reaches egress NE 107.

In an embodiment, the PPR information 170 representing PPR graph 500 includes a PPR type 183, a PPR-ID 186, and PPR-PDEs 590A-N spread across four PDE branches 550A-D. In an embodiment, the PPR type 183 includes a value identifying that the PPR graph 500 represents a PPR tree having multiple ingress NEs 101, 121, 120 and 118 and a single egress NE 107. In an embodiment, the PPR-ID 186 includes an identifier of PPR graph 500, such as, for example, a label, address, or identifier representing the egress NE 107.

In an embodiment in which the PPR graph 500 includes several branches 580A-D, the PPR information 170 may include PDE branches 550A-D, each PDE branch 550A-D corresponding to a branch 580A-D on the PPR graph 500. Each PDE branch 550A-D includes a branch ID 563A-D identifying the branch 580A-D being described by the PDE branch 550A-D and one or more PPR-PDEs 590A-N. PPR-PDEs 590A-N are similar to PPR-PDEs 190 and 490A-E (hereinafter referred to as "PPR-PDEs 490") in that PPR-PDEs 590A-N each describe an element on the branch 580A-D.

In the example shown in FIG. 5, PDE branch 550A includes PPR-PDEs 590A-F. PPR-PDE 590A includes a label, address, or identifier describing NE 101 and a source flag 191 indicating that NE 101 is an ingress NE 101 or source NE 101 of traffic to be forwarded along the PPR graph 500. PPR-PDE 590B includes a label, address, or identifier describing NE 111, PPR-PDE 590C includes a label, address, or identifier describing NE 110, PPR-PDE 590D includes a label, address, or identifier describing NE 109, and PPR-PDE 590E includes a label, address, or identifier describing NE 108. PPR-PDE 590F includes a label, address, or identifier describing NE 107 and a destination flag 193 indicating that NE 107 is an egress NE 107 or destination NE 107 of traffic to be forwarded along the PPR graph 500.

PDE branch 550B includes PPR-PDEs 590G-I and PPR-PDE 590C. PPR-PDE 590G includes a label, address, or identifier describing NE 121 and a source flag 191. PPR-PDE 590H includes a label, address, or identifier describing NE 112, and PPR-PDE 590I includes a label, address, or identifier describing NE 113. PPR-PDE 590C may include the label, address, or identifier describing the common NE 110 or a pointer to the PPR-PDE 590C included in the PDE branch 550A.

PDE branch 550C includes PPR-PDEs 590J-L and PPR-PDE 590D. PPR-PDE 590J includes a label, address, or identifier describing NE 120 and a source flag 191. PPR-PDE 590K includes a label, address, or identifier describing NE 119, and PPR-PDE 590L includes a label, address, or identifier describing NE 114. PPR-PDE 590D may include the label, address, or identifier describing the common NE 109 or a pointer to the PPR-PDE 590D included in the PDE branch 550A.

PDE branch 550D includes PPR-PDEs 590M-N and PPR-PDE 590E. PPR-PDE 590M includes a label, address, or identifier describing NE 118 and a source flag 191. PPR-PDE 590N includes a label, address, or identifier describing NE 115. PPR-PDE 590D may include the label, address, or identifier describing the common NE 108 or a pointer to the PPR-PDE 590E included in the PDE branch 550A.

In an embodiment, the central entity 165 generates the PPR information 170 and then sends the PPR information 170 to one of the NEs 104 via the central entity-to-domain link 166. The headend NE 104 processes the PPR information 170 and floods the PPR information 170 to the other NEs 101-103 and 105-121 in the network 175. In another embodiment, an administrator of network 175 sends the PPR information 170 to one of the NEs 101-121, which then floods the network 175 with the PPR information 170.

Figure 6:
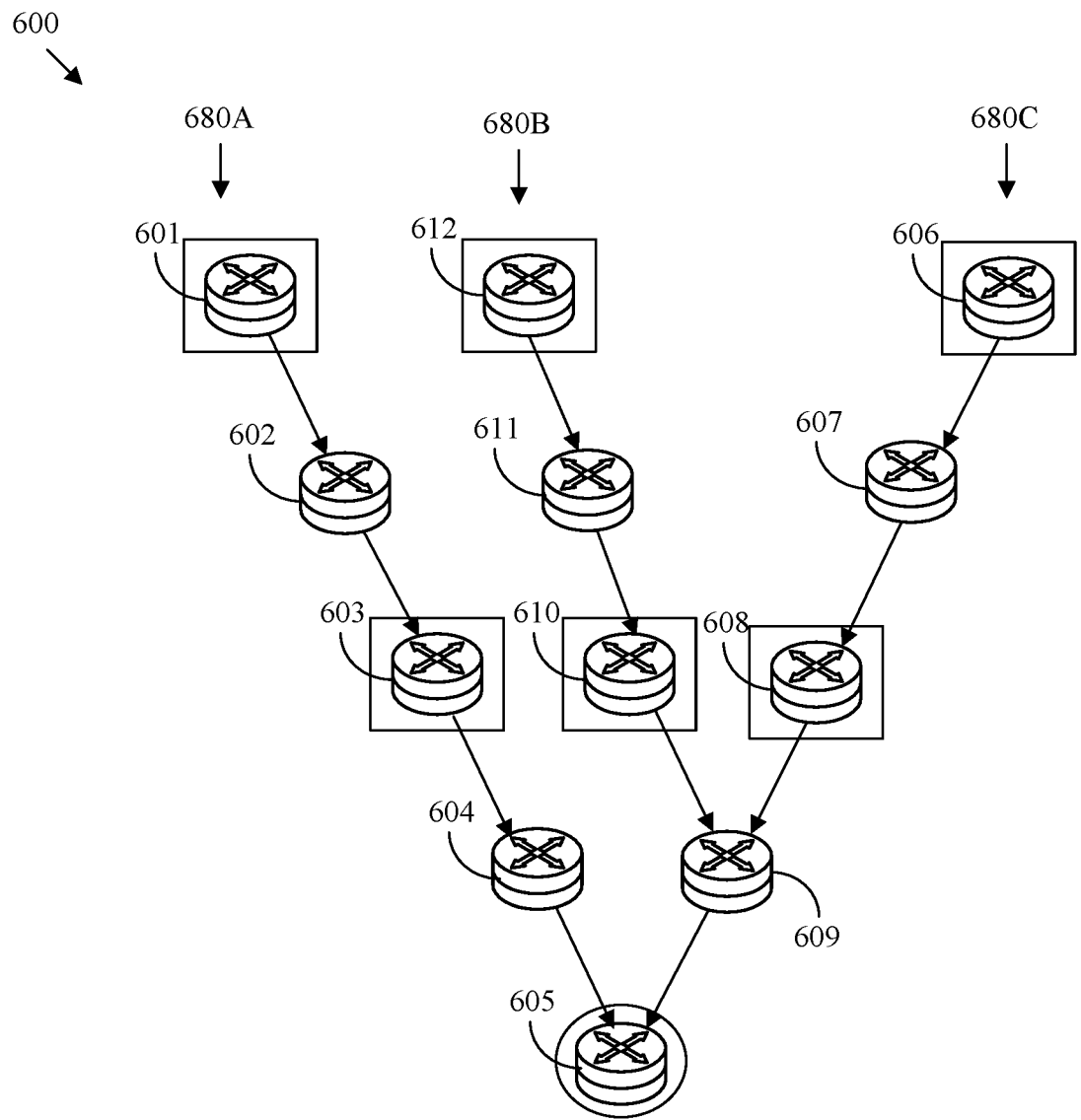
FIG. 6 is a diagram of a PPR graph implemented as a tree according to various embodiments of the disclosure.

FIG. 6 is a diagram of a PPR graph 600 implemented as a PPR tree according to various embodiments of the disclosure. As shown by FIG. 6, PPR graph 600 includes NEs 601-612, which are each similar to NEs 101-121 of FIGS. 1A-B. The PPR graph 600 is similar to PPR graph 500, in that PPR graph 600 includes multiple ingress NEs 601, 603, 606, 608, 610, and 612 (also referred to as source NEs) and at least one egress NE 605 (also referred to as a destination NE). The ingress NEs 601, 603, 606, 608, 610, and 612 are represented in FIG. 6 with rectangles, and the single egress NE 605 is represented with a circle.

The PPR graph 600 also includes three branches 680A-C. Branch 680A includes the following sequence of NEs: NEs 601, 602, 603, 604, and 605. Branch 680B includes the following sequence of NEs: NEs 612, 611, 610, and 609. Branch 680C includes the following sequence of NEs: NEs 606, 607, 608, 609, and 605.

Figure 7:
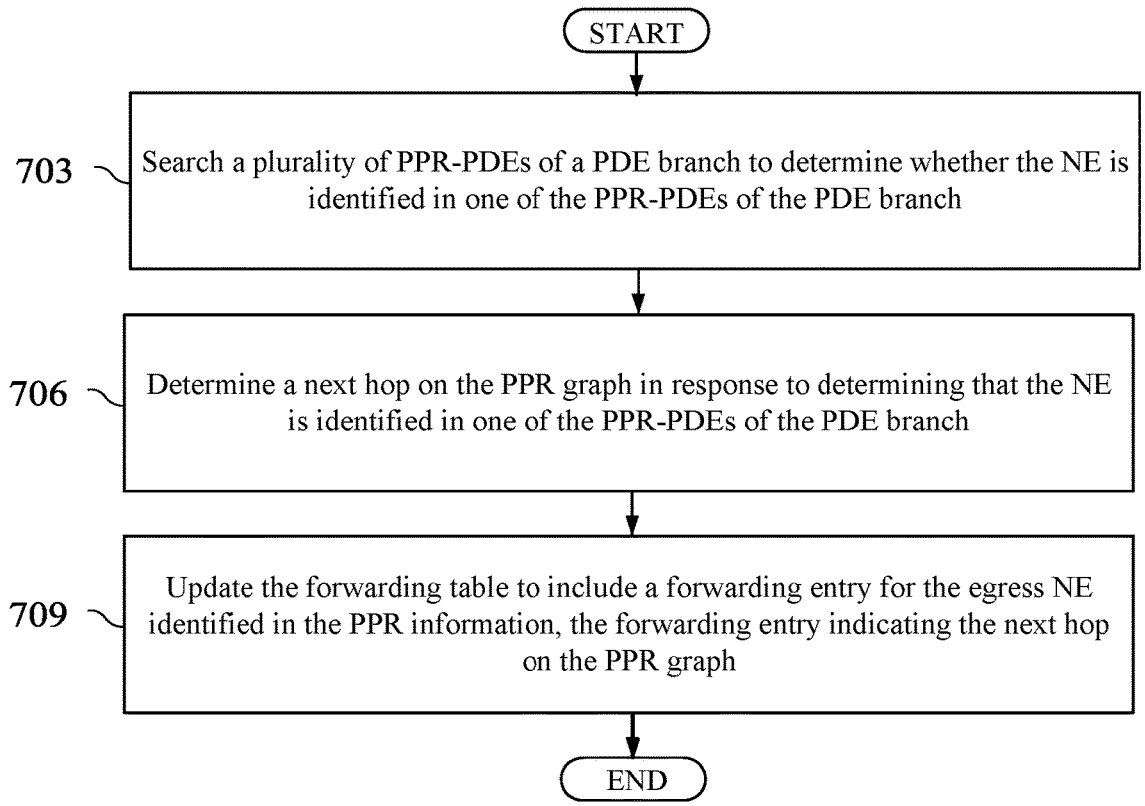
FIG. 7 is a method for processing PPR information describing the PPR graph of FIG. 6 according to various embodiments of the disclosure.

FIG. 7 is a method 700 for processing PPR information 170 describing the PPR graph 600 of FIG. 6 according to various embodiments of the disclosure. Method 700 may be implemented by any of NEs 601-612 of PPR graph 600, which again is implemented as a PPR tree. Method 700 is implemented when an NE 601-612 receives the PPR information 170 describing PPR graph 600 from at least one of a central entity 165, another NE 601-612, or an administrator of the network 175.

At step 703, the PPR-PDEs 590A-N (hereinafter referred to as "PPR-PDE 590") of a first PDE branch 550A-D (hereinafter referred to as "PDE branch 550") included in the PPR information 170 representing the PPR graph 600 are searched to determine whether the NE 601-612 is identified in one of the PPR-PDEs 590. For example, the network configuration module 335 executed by the processor 330 is configured to search the plurality of PPR-PDEs 590 of a first PDE branch 550 included in the PPR information 170.

For example, suppose that NE 609 is implementing method 700. NE 609 is configured to search through the PPR-PDEs 590 of a first PDE branch 550, which may describe branch 680A. In this case, NE 609 is not identified in any of the PPR-PDEs 590 describing branch 680A and, therefore, ignores the PPR-PDEs 590 describing branch 680A.

Continuing, NE 609 is configured to search through the PPR-PDEs 590 of a second PDE branch 550, which describes branch 680B. In this case, NE 609 is identified in the last PPR-PDE 590 describing branch 680B. However, NE 609 ignores the last PPR-PDE 590 describing branch 680B because NE 609 is not an egress NE, is the last hop of branch 680B, and is the common NE 609 between branch 680B and 680C. Thereafter, NE 609 searches through PPR-PDEs 590 of a third PDE branch 550, which describes branch 680C. In this case, NE 609 determines that a PPR-PDEs 590 describing branch 680C identifies NE 609 as being on a path towards an egress NE 605.

At step 706, a determination of a next hop on the PPR graph 600 is made in response to the NE 601-612 being identified in one of the PPR-PDEs 590. For example, the network configuration module 335 executed by the processor 330 is configured to determine a next hop on the PPR graph 600.

Continuing with the example, after NE 609 determines that a PPR-PDE 590 describing branch 680C identifies NE 609 as being on a path towards an egress NE 605, the NE 609 determines that the next PPR-PDE 590 on this path describes egress NE 605.

At step 709, NE 609 updates its forwarding database 365 to include a forwarding entry 370 for the egress NE 605 describing the next hop on the path to the egress NE 605. For example, the network configuration module 335 executed by the processor 330 is configured to update the forwarding database 365. In an embodiment, the forwarding entry 370 may include the next PPR-PDE 590 describing egress NE 605. In an embodiment, the forwarding entry 370 also includes a source flag 191 and destination flag 193, when applicable.

As another example, supposing NE 612 is implementing method 700, NE 612 may first determine that NE 612 is identified in the PPR-PDEs 590 describing branch 680B. NE 612 then determines that the egress NE 605 is the egress NE for branch 680B, and that NE 611 is the next hop (e.g., defined as the next PPR-PDE 590) on the path to the egress NE 605. NE 612 updates the forwarding database 365 to include a forwarding entry 370 corresponding the next PPR-PDE 590 describing NE 611.

Method 700 is one example of how an NE 601-612 processes the PPR information 170 describing the PPR graph 600. However, it should be appreciated that NEs 601-612 may process the PPR information 170 describing the PPR graph 600 using various other methods and implementations.

Figure 8:
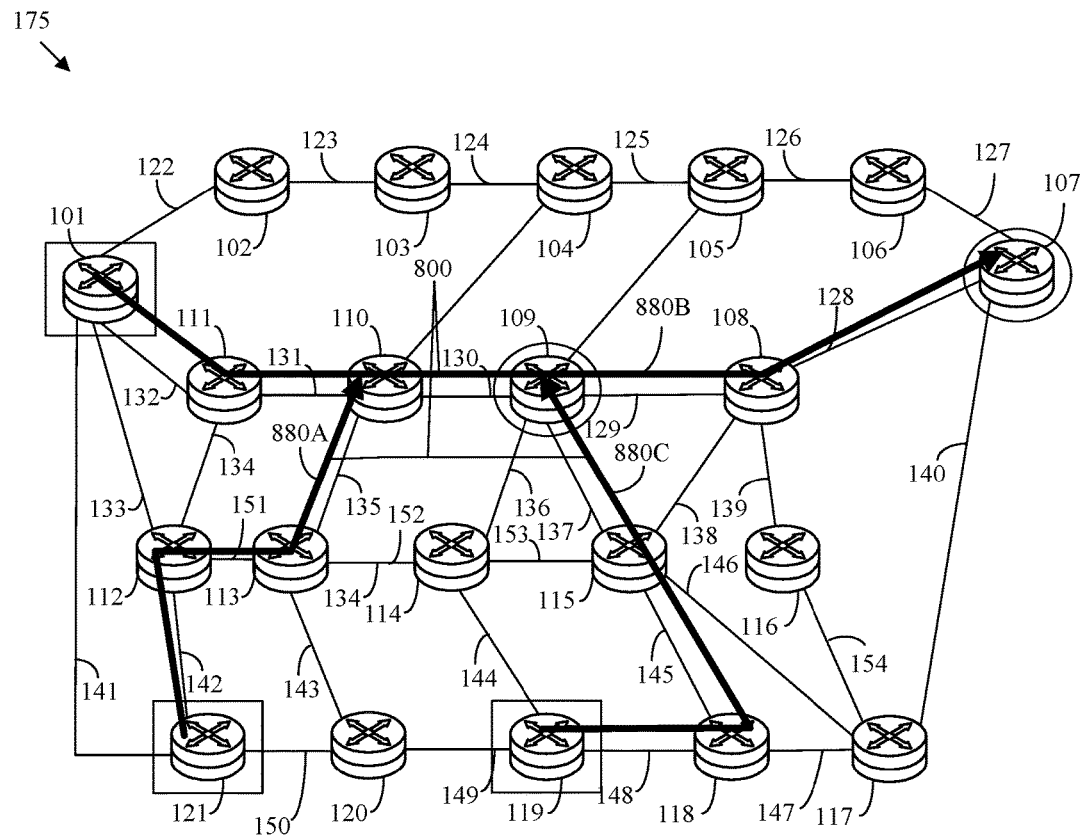
FIG. 8 is a diagram illustrating another PPR graph in the network of FIG. 1B according to various embodiments of the disclosure.
Figure 9:
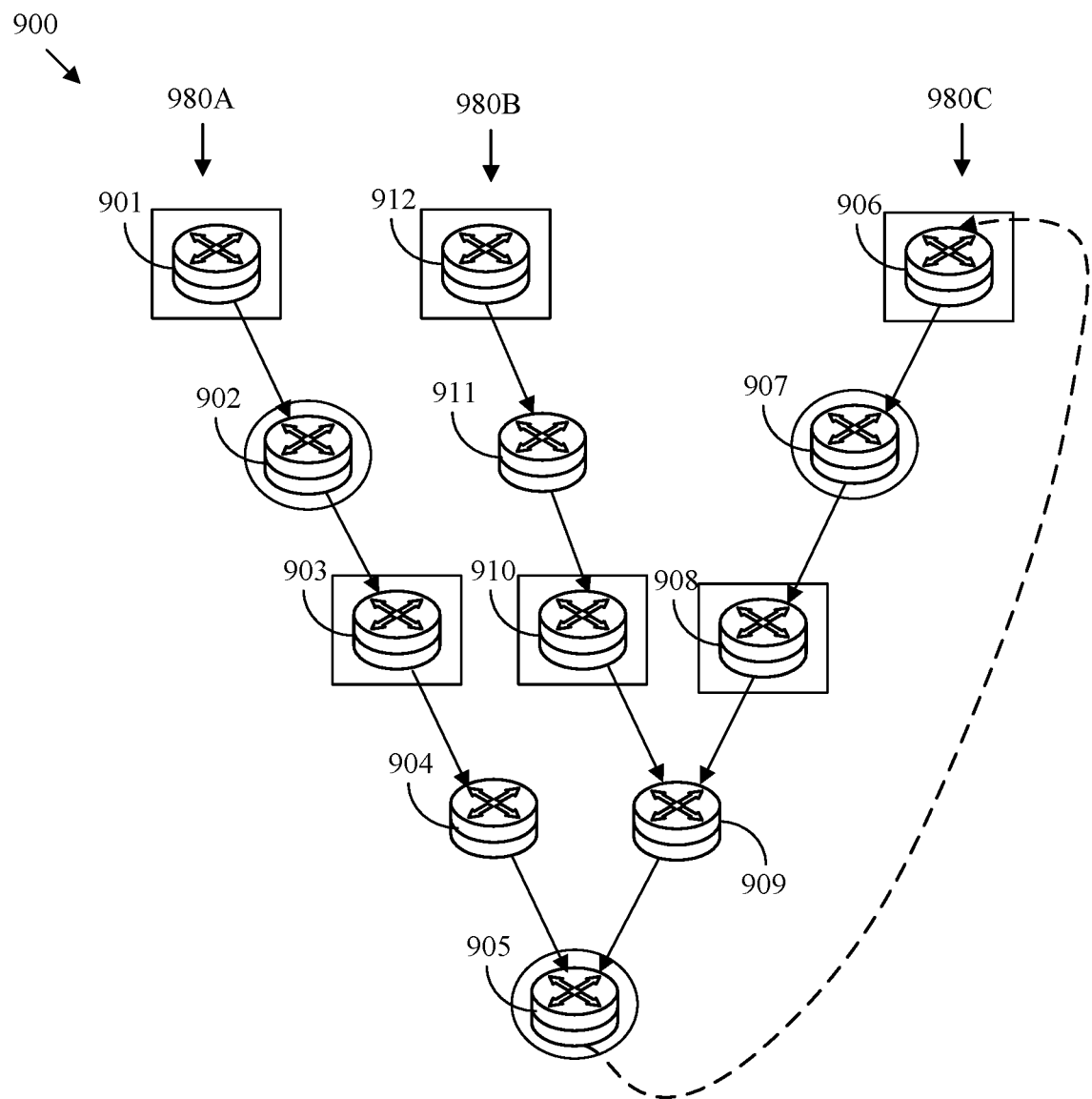
FIG. 9 is a diagram of a PPR graph implemented as a forest according to various embodiments of the disclosure.

FIGS. 5-7 describe a PPR tree having multiple ingress NEs but only a single egress NE or destination NE. FIGS. 8-9 describe a PPR forest with multiple ingress NEs and multiple egress NEs.

FIG. 8 is a diagram illustrating a PPR graph 800 in network 175 according to various embodiments of the disclosure. Similar to FIG. 1B, network 175 in FIG. 8 includes NEs 101-121 interconnected by links 122-154. PPR graph 800 is similar to PPR graph 500 of FIG. 8, except that PPR graph 800 includes multiple egress NEs 109 and 107, instead of just a single egress NE 107.

The PPR graph 800 shown in FIG. 8 is implemented as PPR forest, which includes multiple ingress NEs 101, 121, and 119, and multiple egress NEs 109 and 107. As shown by FIG. 8, the ingress NEs 101, 121, and 119 are represented with rectangles, and the multiple egress NEs 109 and 107 are represented with circles.

The PPR graph 800 includes one or more branches 880A-C. Each branch 880A-C includes a sequence of elements in the network 175 connecting one of the ingress NEs 101, 121, and 119 to another NE in the PPR graph 800. In an embodiment, each branch 880A-C shares at least one common NE.

As shown by FIG. 8, PPR graph 800 includes three branches 880A-C. The first branch 880A includes the following elements: ingress NE 101, link 132, NE 111, link 131, NE 110, link 130, NE 109, link 129, NE 108, link 128, and egress NE 107. The second branch 880C includes the following elements: ingress NE 121, link 142, NE 112, link 151, NE 113, link 135, and NE 110. In this case, the second branch 880B interconnects with the first branch 880A at NE 110, and thus, the first branch 880A and the second branch 880B share a common NE 110. In this embodiment, traffic originating from ingress NE 121 can reach either egress NE 109 or egress NE 107 by being forwarded through the second branch 880B until the traffic reaches either egress NE 109 or egress NE 107. In an embodiment, NE 110 continues to forward the traffic along the first branch 880A until the traffic reaches either egress NE 109 or egress NE 107.

The third branch 880C includes the following elements: ingress NE 119, link 148, NE 118, link 145, NE 115, link 137, and NE 109. In this case, the third branch 880C interconnects with the first branch 880A at NE 109, and thus, the first branch 880A and the third branch 880C share a common NE 109. In this embodiment, traffic originating from ingress NE 119 can reach either egress NE 109 or egress NE 107 by being forwarded through the third branch 880C until the traffic reaches NE 109. In an embodiment, NE 109 can act as the egress NE and forward the traffic external to network 175. In another embodiment, NE 109 continues to forward the traffic along the first branch 880A until the traffic reaches egress NE 107.

In an embodiment, the PPR information 170 representing PPR graph 800 includes a PPR type 183, a PPR-ID 186, and PPR-PDEs 890A-L spread across three PDE branches 850A-C. In an embodiment, the PPR type 183 includes a value identifying that the PPR graph 800 represents a PPR forest having multiple ingress NEs 101, 121, and 119 and multiple egress NEs 109 and 107.

In an embodiment in which the PPR graph 800 includes several branches 880A-C, the PPR information 170 may include PDE branches 850A-C, each PDE branch 850A-C corresponding to a branch 880A-C on the PPR graph 800. Each PDE branch 850A-C includes a branch ID 863A-C identifying the branch 880A-C being described by the PDE branch 850A-C and one or more PPR-PDEs 890A-L. PPR-PDEs 890A-L are similar to PPR-PDEs 190, 490, 590 in that PPR-PDEs 890A-L each describe an element on the PPR graph 800.

In the example shown in FIG. 8, PDE branch 850A includes PPR-PDEs 890A-F. PPR-PDE 890A includes a label, address, or identifier describing NE 101 and a source flag 191 indicating that NE 101 is an ingress NE 101 or source NE 101 of traffic to be forwarded along the PPR graph 800. PPR-PDE 890B includes a label, address, or identifier describing NE 111, and PPR-PDE 890C includes a label, address, or identifier describing NE 110. PPR-PDE 890D includes a label, address, or identifier describing NE 109 and a destination flag 193 indicating that NE 109 is an egress NE 109 or destination NE 109 of traffic to be forwarded along the PPR graph 800. In an embodiment, PPR-PDE 890D also includes the PPR-ID 186, which may be a label, address, or identifier identifying egress NE 109.

PPR-PDE 890E includes a label, address, or identifier describing NE 108. PPR-PDE 890F includes a label, address, or identifier describing NE 107 and a destination flag 193 indicating that NE 107 is an egress NE 107 or destination NE 107 of traffic to be forwarded along the PPR graph 800. In an embodiment, PPR-PDE 890F also includes the PPR-ID 186, which may be a label, address, or identifier identifying egress NE 107.

PDE branch 850B includes PPR-PDEs 890G-I and PPR-PDE 890C. PPR-PDE 890G includes a label, address, or identifier describing NE 121 and a source flag 191. PPR-PDE 890H includes a label, address, or identifier describing NE 112, and PPR-PDE 8901 includes a label, or identifier describing NE 113. PPR-PDE 890C may include the label, address, or identifier describing the common NE 110 or a pointer to the PPR-PDE 890C included in the PDE branch 850A.

PDE branch 850C includes PPR-PDEs 890J-L and PPR-PDE 890D. PPR-PDE 890J includes a label, address, or identifier describing NE 119 and a source flag 191. PPR-PDE 890K includes a label, address, or identifier describing NE 118, and PPR-PDE 890L includes a label, address, or identifier describing NE 115. PPR-PDE 890D may include the label, address, or identifier describing the common NE 109 or a pointer to the PPR-PDE 890D included in the PDE branch 850A.

FIG. 9 is a diagram of a PPR graph 900 implemented as a PPR forest according to various embodiments of the disclosure. As shown by FIG. 9, PPR graph 900 includes NEs 901-912, which are each similar to NEs 101-121 of FIGS. 1A-B. The PPR graph 900 is similar to PPR graph 800, in that PPR graph 900 includes multiple ingress NEs 901, 903, 906, 908, 910, and 912 (also referred to as source NEs) and multiple egress NEs 902, 905, and 907 (also referred to as a destination NEs). The ingress NEs 901, 903, 906, 908, 910, and 912 are represented in FIG. 9 with rectangles, and the egress NEs 902, 905, and 907 are represented with circles.

The PPR graph 900 also includes three branches 980A-C. Branch 980A includes the following sequence of NEs: NEs 901, 902, 903, 904, and 905. Branch 980B includes the following sequence of NEs: NEs 912, 911, 910, and 905. Branch 980C includes the following sequence of NEs: NEs 906, 907, 908, 909, and 910. As shown by the dotted arrow in FIG. 9, branch 980C is cyclical, in that NE 905 and NE 906 are connected within the PPR graph 900 such that traffic can be transmitted from NE 905 to NE 906 in a circular fashion.

Programming each of the NEs 901-912 to forward traffic along the PPR graph 900 may be implemented in a manner similar to that described above with reference to method 700, except that each NE 901-912 adds a forwarding entry 370 for each egress NE 905 and 907 in the PPR graph 900. For example, after NE 901 receives PPR information 170 describing PPR graph 900, NE 901 determines whether NE 901 is identified in any of the PPR-PDEs 890 describing the elements of branch 980A. As NE 901 is included in branch 980A, NE 901 is also identified in one of the PPR-PDEs 890 describing the elements of branch 980A. At this NE 901 identifies that there are two egress NEs 902 and 907 included in branch 980A. In this case, NE 901 determines a next hop for each of the egress NEs 902 and 907 included in the branch 980A and creates a forwarding entry 370 for each of the egress NEs 902 and 907. The forwarding entry 370 for egress NE 902 may include the next PPR-PDE 890 describing NE 902, and the forwarding entry 370 for egress NE 905 may also include the next PPR-PDE 890 describing NE 902.

As another illustrative example, assume that NE 903 receives PPR information 170 describing PPR graph 900. In this case, NE 903 only creates a forwarding entry 370 for egress NE 905 on branch 980A. This is because NE 903 may not be configured to forward traffic backwards to egress NE 902 and because branch 980A is not a cyclical branch.

As yet another example, with regard to the cyclical branch 980C, assume that NE 909 receives PPR information 170 describing PPR graph 900. In this case, NE 909 creates a forwarding entry 370 for both egress NE 905 and egress NE 907 because branch 980C is a cyclical branch. In this example, after NE 909 receives the PPR information 170 describing PPR graph 900, NE 909 may determine that NE 909 is not identified in the PPR-PDEs 890 for branches 980A-B. However, NE 909 determines that NE 909 is identified in the PPR-PDEs 890 for branch 980C. NE 909 first determines that NE 905 is an egress NE 905 of branch 980C. Since branch 980C is cyclical, NE 909 may continue to the beginning of the branch NE 980C and then determine that NE 907 is another egress NE 907 of branch 980C. NE 909 then creates forwarding entries 370 for each of the egress NEs 905 and 907.

In an embodiment, a PPR graph 900 implemented as PPR forest is only permitted to include a single cyclical loop branch, such as branch 980C. In this embodiment, the central entity 165 is configured to determine the PPR graph 900 with a maximum of one cyclical loop branch, such as branch 980C.

Figure 10:
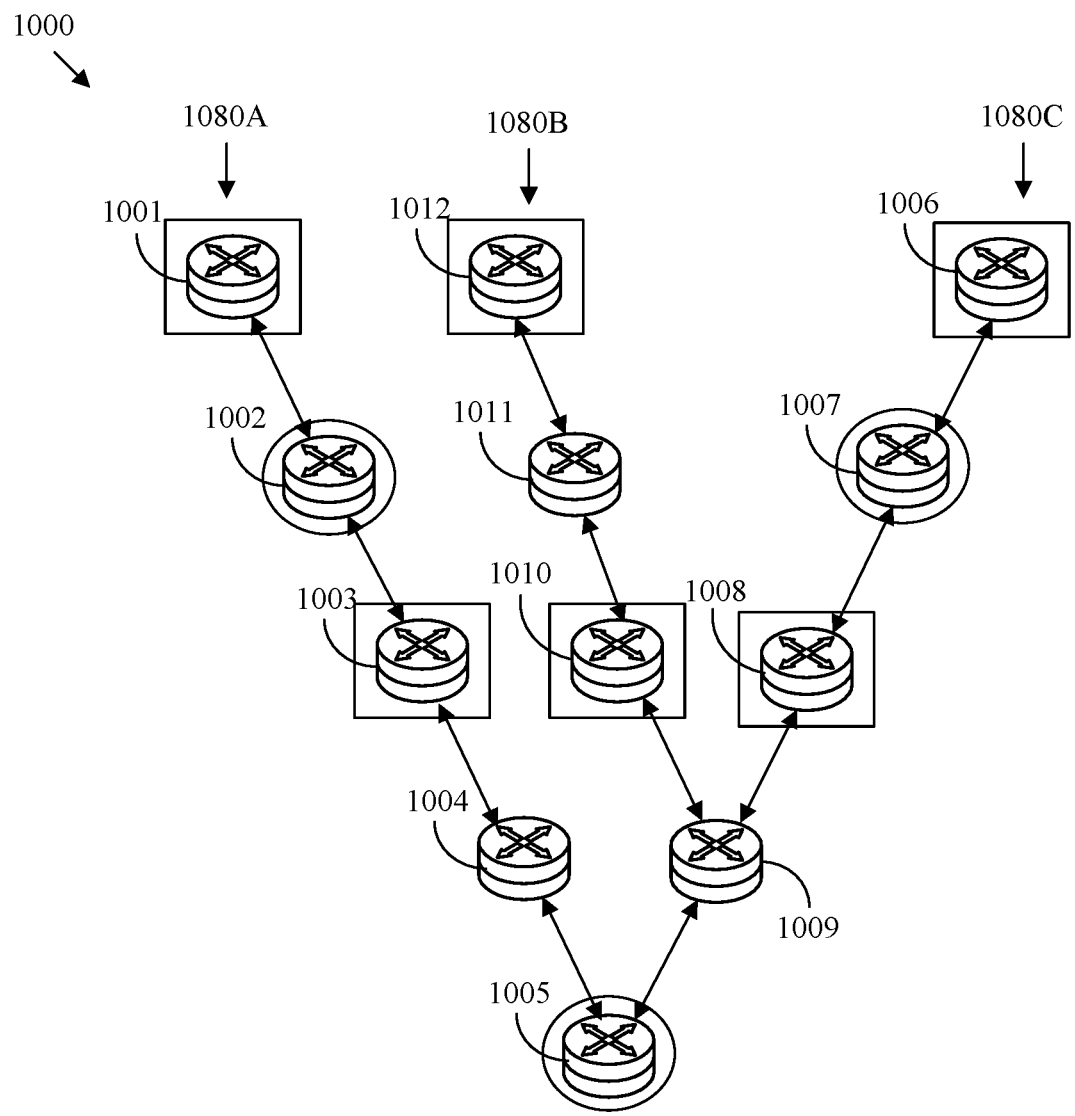
FIG. 10 is a diagram of a PPR graph implemented as a bidirectional forest according to various embodiments of the disclosure.

FIG. 10 is a diagram of a PPR graph 1000 implemented as a bidirectional forest according to various embodiments of the disclosure. As shown by FIG. 10, PPR graph 1000 includes NEs 1000-1012, which are each similar to NEs 101-121 of FIGS. 1A-B. The PPR graph 1000 is similar to PPR graph 900, in that PPR graph 1000 includes three branches 1080A-C with multiple ingress NEs 1001, 1003, 1006, 1008, 1010, and 1012 (also referred to as source NEs) and multiple egress NEs 1002, 1005, and 1007 (also referred to as a destination NEs). The ingress NEs 1001, 1003, 1006, 1008, 1010, and 1012 are represented in FIG. 10 with rectangles, and the egress NEs 1002, 1005, and 1007 are represented with circles. However, unlike the NEs 901-912 of PPR graph 900 that were only configured to transmit traffic in one direction, the NEs 1001-1012 of PPR graph 1000 are configured to transmit traffic in both directions (forwards and backwards).

Programming each of the NEs 1001-1012 to forward traffic along the PPR graph 1000 may be implemented in a manner similar to that described above with reference to method 700, except that each NE 1001-1112 adds a forwarding entry 370 for every single egress NE 1002, 1005, and 1007 in the PPR graph 1000. This is because each NE 1001-1012 in the PPR graph 1000 has access to every other NE 1001-1012, due to the bidirectional nature of the PPR graph 1000.

For example, after NE 1001 receives PPR information 170 describing PPR graph 1000, NE 1001 determines whether NE 1001 is identified in any of the PPR-PDEs 890 describing the PPR graph 1000. At this point, NE 1001 identifies that there are three egress NEs 1002, 1005, and 1007 included in PPR graph 1000. In this case, NE 1001 determines a next hop for each of the egress NEs 1002, 1005, and 1007 and creates a forwarding entry 370 for each of the egress NEs 1002, 1005, and 1007. The forwarding entry 370 for egress NE 1002 may include the next PPR-PDE 890 describing NE 1002, forwarding entry 370 for egress NE 1005 may include the next PPR-PDE 890 describing NE 1002, and the forwarding entry 370 for egress NE 1007 may also include the next PPR-PDE 890 describing NE 1002. In this embodiment, each of the NEs 1001-1012 program a forwarding entry 370 for each egress NE 1002, 1005, and 1007 of PPR graph 1000.

In an embodiment, a PPR graph 1000 implemented as bidirectional forest is not permitted to include a cyclical branch or loop. In this embodiment, the central entity 165 is configured to determine a PPR graph 1000 implemented as bidirectional forest without the inclusion of a cyclical branch or loop.

Figure 11:
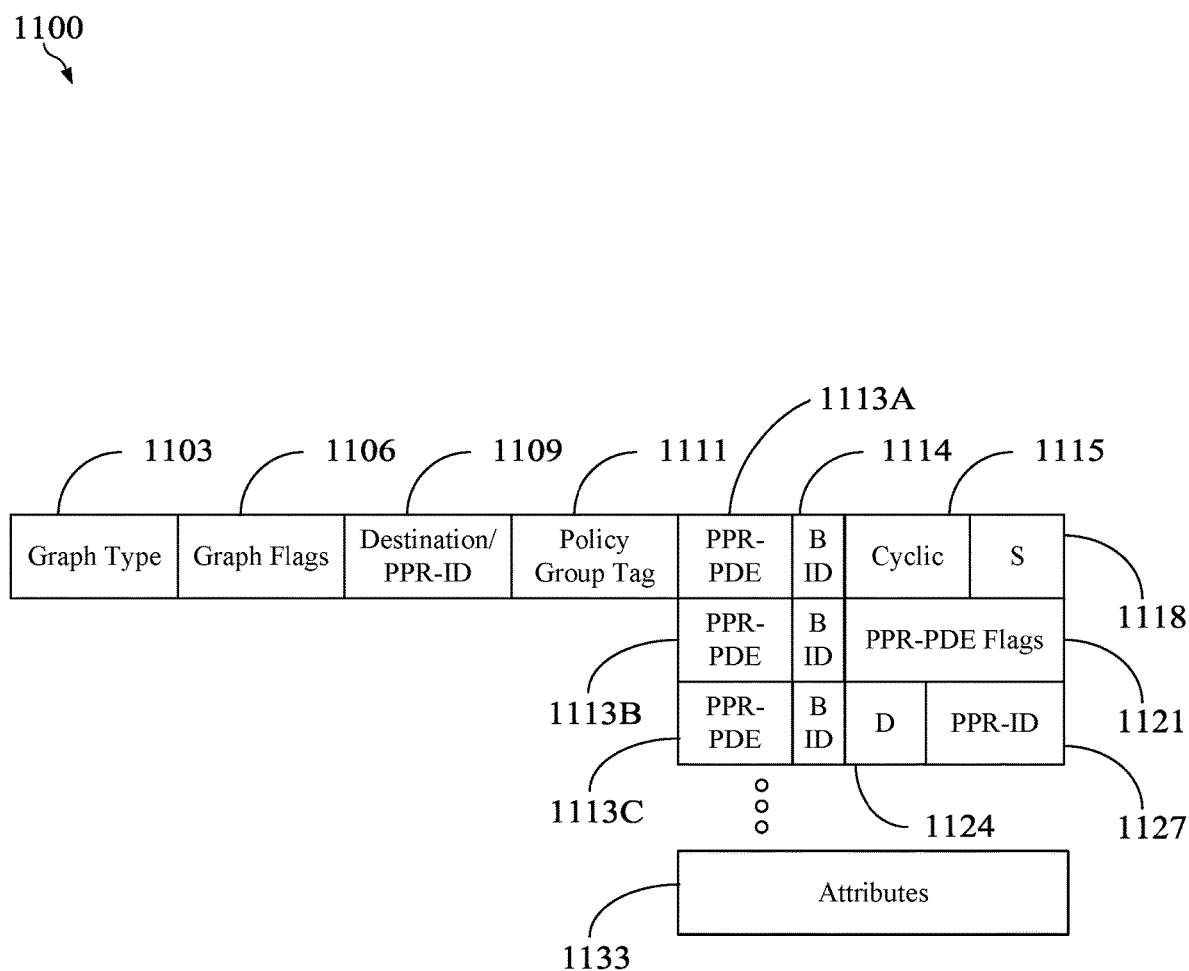
FIG. 11 is a diagram of an advertisement including PPR information according to various embodiments of the disclosure.

FIG. 11 is a diagram of an advertisement 1100 including the PPR information 170 according to various embodiments of the disclosure. In an embodiment, the advertisement 1100 may be transmitted by the central entity 165 to one of the headend NEs 101-121 of network 175. In an embodiment, the advertisement 1100 may be transmitted between one or more of the NEs 101-121 of network 175.

The advertisement 1100 includes various fields that are used to carry information describing the PPR graphs 180, 400, 500, 600, 800, 900, or 1000, such as PPR information 170. As shown by FIG. 11, advertisement 1100 includes a graph type field 1103, graph flags 1106, a destination/PPR-ID field 1109, a policy group tag field 1111, one or more PPR-PDE field 1113A-C, and an attributes field 1133.

The graph type field 1103 may carry a PPR type 183, which is a value indicating whether the PPR graph being described is a standard PPR, a tree, a forest, or a bidirectional forest. The graph flags field 1106 may include one or more flags, or bits, that are set to instruct a receiving NE how to program the information carried by the advertisement 1100. The destination/PPR-ID field 1109 may carry a label, address, or identifier of one or more egress NEs on a PPR graph.

The policy group tag field 1111 may carry a policy group tag assigned to the PPR graph being described by the advertisement. In an embodiment, a policy group tag is an identifier, or a value, assigned to one or more PPR graphs. In an embodiment, the central entity 165 determines the policy group tag for a particular PPR graph based on an attribute of a resource to be reserved along the PPR graph. An attribute refers to network characteristic or traffic engineering (TE) parameter of the resource, such as bandwidth required to transmit a data packet along the PPR graph, a burst size permitted to be transmitted along the PPR graph, a bounded latency permitted to occur on an NE along the PPR graph, or a lifetime indicating a time period during which the resource is to be reserved on each NE and/or link of the PPR graph. In an embodiment, PPR graphs having one or more common attributes may be assigned the same policy group tag.

In an embodiment, when a customer requests a path to a destination or an egress NE, the central entity 165 or an ingress NE may determine that the customer is associated with a particular policy group tag. For example, the customer is associated with a particular policy group tag based on attribute that the customer requested. In this embodiment, the ingress NE or the central entity 165 selects on of the PPR graphs having the particular policy group tag for the customer and forwards traffic for the customer along the selected PPR graph.

Advertisement 1100 further includes PPR-PDE fields 1113A-C, which are each configured to carry PPR-PDEs 190, 490, 590, or 890 that describe an element along the PPR graph. Each of the PPR-PDE fields 1113A-C may also include a branch identifier field 1114, a cyclic flag field 1115, a source flag field 1118, PPR-PDE flags 1121, a destination flag field 1124, and PPR-ID field 1127. The branch identifier field 1114 may carry a branch identifier 563 or 863. The source flag field 1118 may carry the source flag 191, and the destination flag field 1124 may carry the destination flag 193. The cyclic flag field 1115 is a flag, or a bit, included in the PPR-PDE for a first NE on a PDE branch. When the cyclic flag field 1115 is set to 1, the cyclic flag field 115 indicates that the the branch is a cyclic branch logically the first NE and the last NE on the branch. The PPR-PDE flags field 1121 includes various flags or bits that describe a condition or state of an element being described by the PPR-PDE. The PPR-ID field 1127 may include a label, address, or identifier of an egress NE being described by the PPR-PDE having the destination flag 193 set.

The attributes field 1133 includes one or more attributes regarding a resource that should be reserved for one or more elements along the PPR graph. As described above, an attribute may be bandwidth required to transmit a data packet along the PPR graph, a burst size permitted to be transmitted along the PPR graph, a bounded latency permitted to occur on an NE along the PPR graph, or a lifetime indicating a time period during which the resource is to be reserved on each NE and/or link of the PPR graph.

Advertisement 1100 shown in FIG. 11 only shows a few fields within a message that is sent to the NEs 101-121 in network 175 with information describing a PPR graph. Advertisement 1100 may include other fields that are not explicitly shown and described with reference to FIG. 11.

Figure 12A:
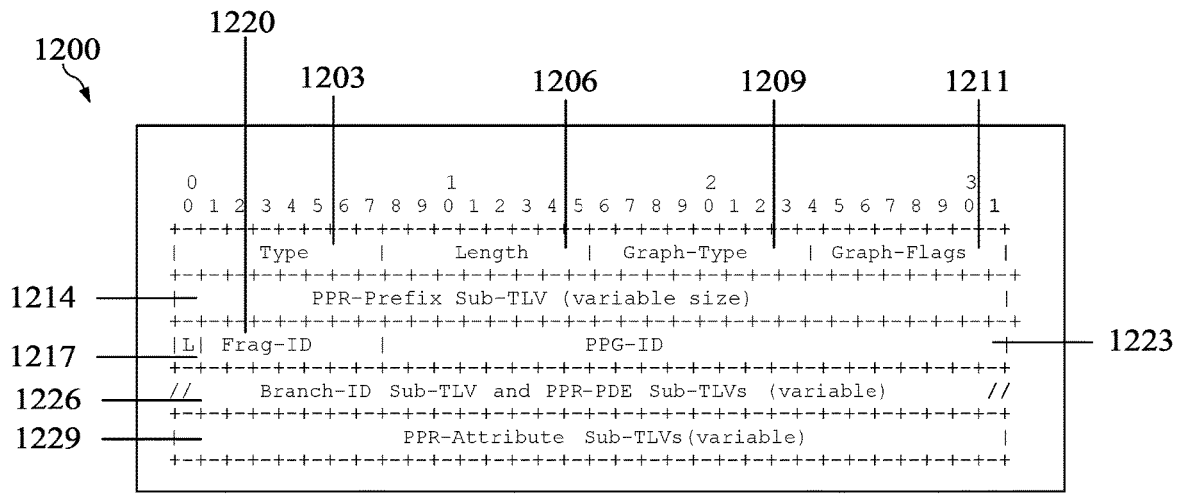
FIGS. 12A-C are type-length-value (TLV) diagrams illustrating various fields of an example advertisement according to various embodiments of the disclosure.
Figure 12B:
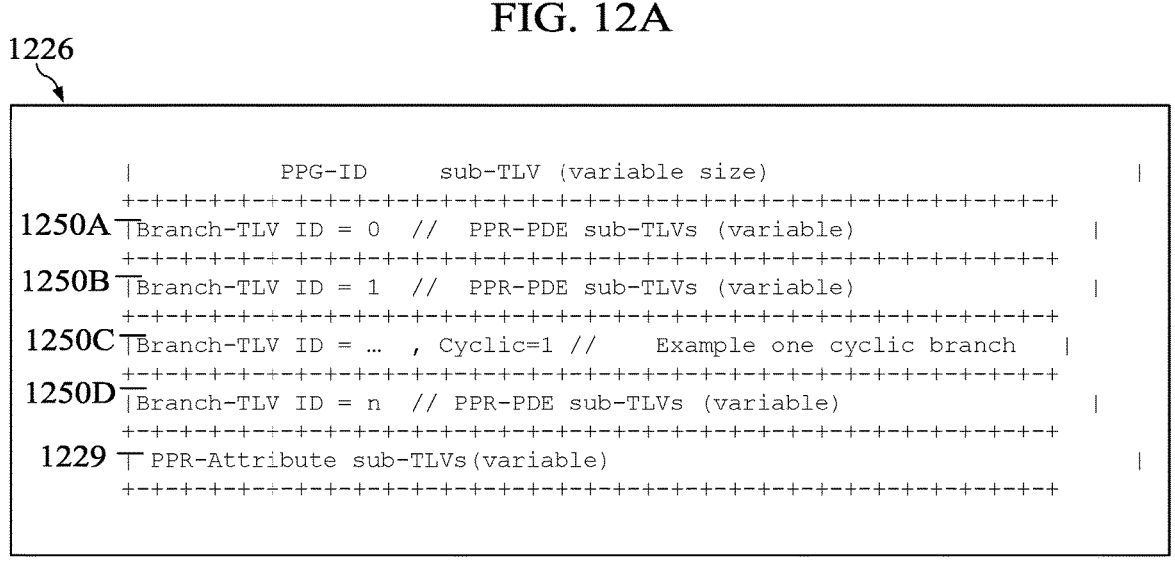
Figure 12C:
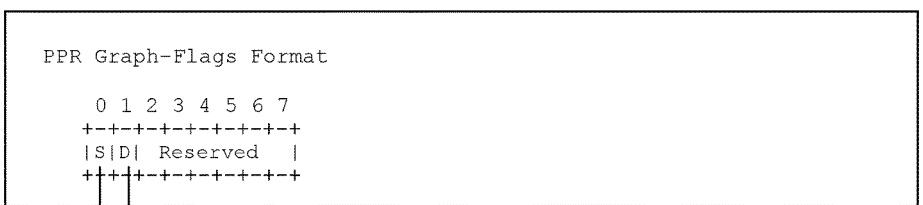

FIGS. 12A-C are type-length-value (TLV) diagrams illustrating various fields of an example advertisement, such as advertisement 1100 of FIG. 11, according to various embodiments of the disclosure. FIG. 12A shows a PPR graph TLV 1200, which includes fields similar to advertisement 1100 that carries the PPR information 170. The PPR graph TLV 1200 includes four logical sections: the encoding of the PPR prefix, the PPG-ID 344, the PPR-PDE sub-TLVs belonging to one or more branch IDs, and a set of optional attributes.

As shown by FIG. 12A, the PPR graph TLV 1200 includes a type field 1203, a length field 1206, a graph type field 1209, graph flags 1211, a PPR-prefix sub-TLV 1214, a last fragment flag 1217, a fragment identifier field 1220, a PPG-ID field 1223, a branch-ID sub-TLV and PPR-PDE sub-TLV 1226, and an attributes sub-TLV 1229. The length field 1206 may carry a total length value of the PPR graph TLV 1200 in bytes. The graph type field 1209 is a one octet value that defines a PPR graph structure. In an embodiment, the graph type field 1209 carries the PPR type 183, which is a value indicating whether the PPR graph is a standard PPR, a tree, a forest, or a bidirectional forest. The graph flags 1211 will be further described below with reference to FIG. 12C.

The PPR-prefix sub-TLV 1214 includes a label, address, or identifier of an egress NE or the destination of the PPR graph. The branch-ID sub-TLV and PPR-PDE sub-TLV 1226 is further described below with reference to FIG. 12B.

In an embodiment, the PPR graph TLV 1200 includes various fields used when the PPR graph TLV 1200 is divided into multiple fragments, as will be further described below with reference to FIG. 13. In this embodiment, each of the fragments is similar to the PPR graph TLV 1200, and each fragment carries different PPR-PDEs. In this embodiment, the PPR graph TLV 1200 includes the last fragment flag 1217, fragment identifier field 1220, and a PPG-ID field 1223. The PPG-ID field 1223 carries a PPG-ID 344, which is a label, address, or identifier identifying the PPR graph being described by the PPR information 170 included in the PPR graph TLV 1200. The PPG-ID 344 remains the same for each of the fragments being sent for a particular PPR graph. The fragment identifier field 1220 indicates an identifier or count of the particular fragment being sent relative to the total number of fragments. The last fragment flag 1217 is a flag, or a bit, that is set to indicate whether the current fragment is a last fragment for a particular PPR graph. The attributes sub-TLV 1229 includes one or more attributes defining a resource to be reserved for a PPR graph.

Referring now to FIG. 12B, shown is the branch-ID sub-TLV and PPR-PDE sub-TLV 1226 of the PPR graph TLV 1200. The branch-ID sub-TLV and PPR-PDE sub-TLV 1226 includes fields 1250A-D, each of which may include a PDE branch, carrying a branch identifier 563 or 863 and one or more PPR-PDEs 190, 490, 590, or 890 describing elements on the branch. As shown by FIG. 12B, one of the fields 1250C describes a branch that is cyclic, denoted using the a cyclic flag 1115. The branch-ID sub-TLV and PPR-PDE sub-TLV 1226 also includes the attributes sub-TLV 1229.

Although only four fields 1250A-D are shown in FIG. 12B, it should be appreciated that any number of fields 1250A-D are included in the branch-ID sub-TLV and PPR-PDE sub-TLV 1226 describing any number of branches on PPR graph.

Referring now to FIG. 12C, shown is the graph flags 1211 of the PPR graph TLV 1200. The graph flags 1211 include an S flag 1261 and a D flag 1262. If the S flag 1261 is set, the PPR graph TLV 1200 should be flooded across the entire domain. If the S flag 1261 is not set, the PPR graph TLV 1200 should not be leaked between IS-IS levels. If the D flag 1262 is set, the PPR graph TLV 1200 is leaked from IS-IS level-2 to IS-IS level 1. Otherwise, the bit should be cleared.

FIG. 13 is a diagram illustrating fragments 1300A-N used to carry PPR information for a PPR graph according to various embodiments of the disclosure. In some cases, networks implementing certain types of IGPs, such as IS-IS, can only send signals having a maximum of 255 bytes. However, some PPR graphs having several branches and numerous elements, which may need much more than 255 bytes to send advertisements 1100 including PPR information 170 describing the PPR graph.

In this case, the advertisement 1100 describing a single PPR graph can be divided into fragments 1300A-N, in which the collection of fragments 1300A-N represent the entire PPR graph. In an embodiment, each fragment 1300A-N carries a subset of the PPR-PDEs for a particular branch of a PPR graph. In an embodiment, each fragment 1300A-N carries a subset of the PPR-PDEs for the entire PPR graph. In an embodiment, each fragment 1300A-N has a size that is less than the size that is capable of being transported in a network implementing a specific IGP.

As shown by FIG. 13, fragment 1300A includes various fields, such as a graph type field 1303, a length field 1306, a header 1309, a PPG-ID field 1311, a fragment ID field 1313, a last fragment flag 1316, a subtype field 1319, and a length field 1321. The graph type field 1303 is similar to the graph type field 1103 of FIG. 11. The length field 1306 may carry a length of the fragment 1300A. The header 1309 includes subtypes describing the PPR graph overall, and may include details such as Quality of Service parameters, and may only be included in the last fragment N. The PPG-ID field 1311 carries a PPG-ID 344, which is a label, address, or identifier identifying the PPR graph. The PPG-ID 344 remains the same for each of the fragments being sent for a particular PPR graph. The fragment ID field 1313 indicates an identifier or count of the particular fragment being sent relative to the total number of fragments. The last fragment flag 1316 is a flag, or a bit, that is set to indicate whether the current fragment is a last fragment for a particular PPR graph. For the fragment 1300A, which may be the first fragment for a PPR graph, the last fragment flag 1316 may be cleared or set to 0. The subtype field 1319 indicates a type of the branch being described by the fragment 1300A. Each branch is one subtype, and the branches may be spread out over the fragments 1300A-N. In an embodiment, a single branch that is too large to fit into a fragment is split up into multiple branches.

Each of the fragments 1300A-N includes one or more PPR-PDEs describing one or more elements on the PPR graph, or a branch of the PPR graph. The one or more PPR-PDEs may be carried PPR-PDE fields, such as PPR-PDE fields 1113A-C.

The last fragment 1300N for a set of fragments 1300A-N describing a PPR graph is substantially similar to the first fragment 1300A, except that the last fragment 1300N includes an attributes field 1350. The attributes field 1350 includes one or more attributes for a resource to be reserved on an element of the PPR graph. In addition, since the last fragment 1300N is the last fragment for a PPR graph, the last fragment flag 1316 for the last fragment 1300N may be set to 1. It should be appreciated that fragments 1300A-N may include other fields that are not necessarily shown by FIG. 13.

Figure 14A:
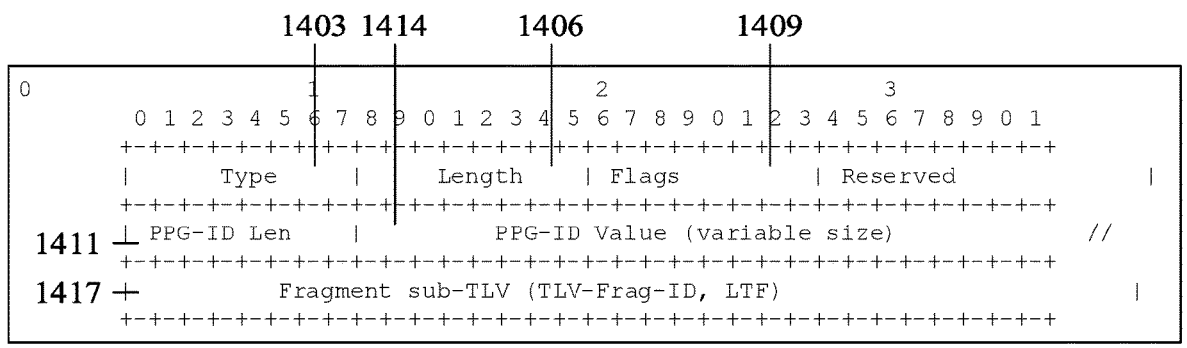
FIGS. 14A-B are TLV diagrams showing examples of fields within a fragment according to various embodiments of the disclosure.
Figure 14B:
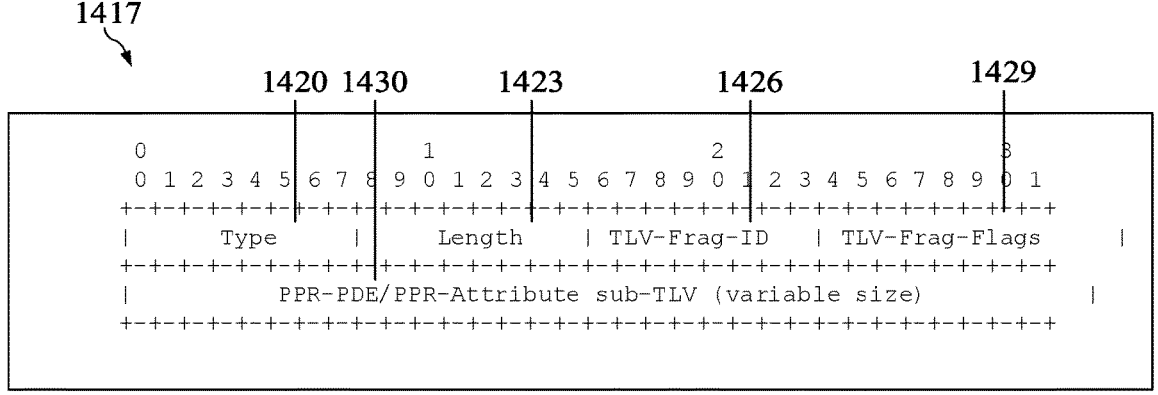

FIGS. 14A-B are TLV diagrams showing examples of fields within a fragment 1300A-N according to various embodiments of the disclosure. FIG. 14A shows fragment TLV 1400, which a new top level IS-IS TLV diagram, with fields similar to those described above with reference to the fragments 1300A-N of FIG. 13. In particular, the fragment TLV 1400 includes a type field 1403, a length field 1406, a flags field 1409, a PPG-ID length field 1411, a PPG-ID field 1414, and a fragment sub-TLV 1417. The type field 1403 is similar to the type field 1303 of FIG. 13, the length field 1406 is similar to the length field 1306 of FIG. 13, the flags field 1409 is similar to the flags field 1121 of advertisement 1100, the PPG-ID field 1414 is similar to the PPG-ID field 1311 of FIG. 13, and the PPG-length field 1411 carries a length of the PPG-ID field 1414. The fragment sub-TLV 1417 is further described below with reference to FIG. 14B. In an embodiment, each fragment 1300A-N includes the fragment TLV 1400, which remains the same for each fragment 1300A-N.

Referring now to FIG. 14B, shown is the fragment sub-TLV 1417, which includes a type field 1420, a length field 1423, a fragment identifier field 1426, fragment flags 1429, a PPR-PDEs and PPR attributes fields 1430. In an embodiment, each fragment 1300A-N includes the fragment sub-TLV 1417, and each fragment sub-TLV 1417 is different for each fragment 1300A-N.

Figure 15:
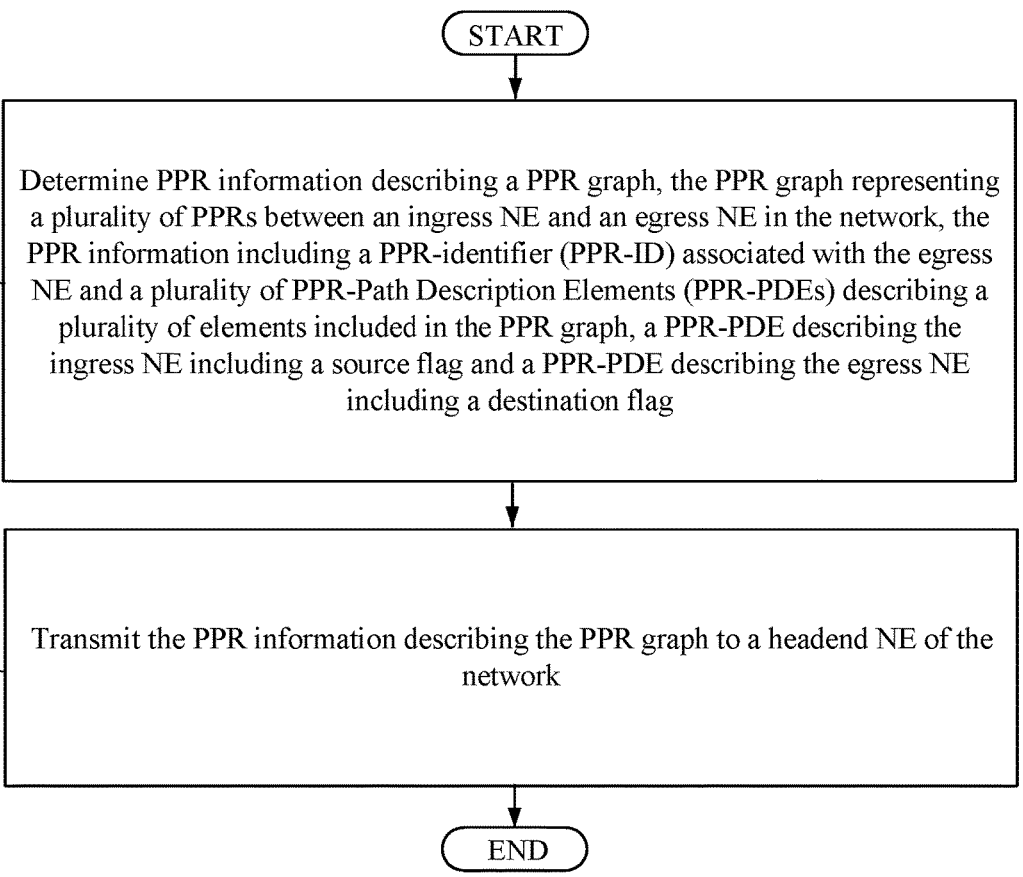

FIG. 15 is a method 1500 for advertising and programming PPR graphs in a network according various embodiments of the disclosure. The PPR graphs may be any one of 180, 400, 500, 600, 800, 900, or 1000. The network may be similar to network 175. In an embodiment, method 1500 may be performed by the central entity 165, which may be implemented as an NE 300. In an embodiment, method 1500 may be performed after a central entity 165 receives instructions or a request to construct a PPR graph.

At step 1503, PPR information 170 describing a PPR graph representing a plurality of PPRs between an ingress NE and an egress NE in the network is determined. For example, the network configuration module 335, executed by the processor 330, determines the PPR information 170. In an embodiment, the PPR information 170 includes a PPR-ID 186 associated with the egress NE and a plurality of PPR-PDEs 190, 590, or 890 describing a plurality of elements included in the PPR graph. In an embodiment, a PPR-PDE 190, 590, or 890 describing the ingress NE includes a source flag 191, and a PPR-PDE 190, 590, or 890 describing the egress NE including a destination flag 193.

In an embodiment, any NE/PPR-PDE can only be a non-last NE/PPR-PDE in one branch but a last-NE/PPR-PDE in more than one branch. In an embodiment, for a PPR graph implemented as a tree, every PDE-ID can be a non-last NE/PPR-PDE in at most one branch and can be a last-PDE in one or more branches. Branches form a tree by joining nodes with the same PDE identifier (PDE-ID). Leaves of the tree may be indicated as ingress NEs or sources, and the root of the tree may be the only egress NE or destination of the tree.

For a PPR graph implemented as a forest, every NE/PPR-PDE can be a non-last-NE/PPR-PDE in at most one branch, but a last-NE/PPR-PDE in zero or more branches. In an embodiment, branches form a tree with at most one branch indicating a "loop." Every NE can be marked as source and/or destination, except leaves of the graph, which are a source and not a destination. There must be at least one destination or egress NE in the looped branch. If there is no looped branch, then the root of the tree is be a destination and cannot be a source.

For a PPR graph implemented as a bidirectional forest, every NE/PPR-PDE can be a non-last PDE in at most one branch. A NE/PPR-PDE can be a last-PDE in one or more branches. Branches form a tree by joining NEs/PPR-PDEs with the same PDE-ID. Leaves of the tree may be ingress NEs. In this case, all connections between NEs are assumed to be bidirectional.

At step 1506, the PPR information 170 is transmitted to a headend NE 104 of the network. For example, a Tx 340 transmits the PPR information 170 to a headend NE 104 of the network. In an embodiment, the headend NE 104 floods the PPR information 170 to a remainder of the NEs 101-103 and 105-121 of the network 175.

FIG. 16 is another method 1600 for advertising and programming PPR graphs in a network according various embodiments of the disclosure. The PPR graphs may be any one of 180, 400, 500, 600, 800, 900, or 1000. The network may be similar to network 175. In an embodiment, method 1600 may be performed by one of the NEs 101-121 in the network 175.

At step 1603, PPR information 170 describing PPR graph representing a plurality of PPRs between an ingress NE and an egress NE in the network is received. For example, Rx 320 receives the PPR information 170. In an embodiment, the PPR information 170 includes a PPR-ID 186 associated with the egress NE and a plurality of PPR-PDEs 190, 590, or 890 describing a plurality of elements included in the PPR graph. In an embodiment, a PPR-PDE 190, 590, or 890 describing the ingress NE includes a source flag 191, and a PPR-PDE 190, 590, or 890 describing the egress NE including a destination flag 193.

At step 1606, a forwarding database 365 is updated to include a forwarding entry 370 for the egress NE in response to identifying the NE in the plurality of PPR-PDEs. For example, the network configuration modules 335, executed by the processor 330, updates to include a forwarding entry 370 to include a forwarding entry 370 for the egress NE in response to identifying the NE in the plurality of PPR-PDEs. In an embodiment, the NE floods the PPR information 170 to a remainder of the NEs 101-121 of the network 175 via an underlying IGP of the network. In an embodiment, the forwarding entry 370 indicates a next hop by which to forward a data packet comprising the PPR-ID.

In an embodiment, the forwarding entry 370 includes the next PPR-PDE of the plurality of PPR-PDEs. In an embodiment, the forwarding entry 370 includes an address prefix indicating the next hop. In an embodiment, the address prefix represents a plurality of NEs along a branch of the PPR graph.

Figure 17:
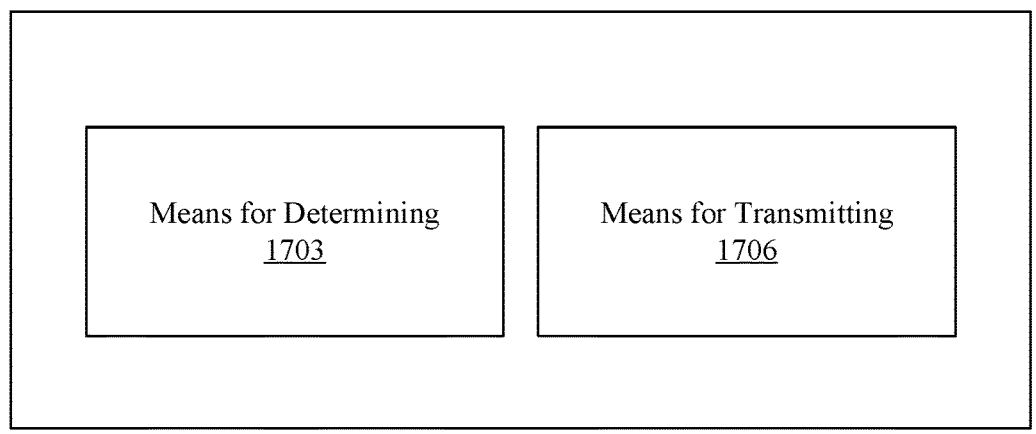
FIGS. 17-18 are apparatuses for advertising and programming PPR graphs according to various embodiments of the disclosure.

FIG. 17 shows an apparatus 1700 for advertising and programming a PPR graph according various embodiments of the disclosure. The apparatus 1700 comprises a means for determining 1703 and a means for transmitting 1706. The means for determining 1703 includes a means for determining PPR information describing a PPR graph, which represents a plurality of PPRs between an ingress NE and an egress NE in the network, the PPR information including a PPR-ID associated with the egress NE and a plurality of PPR-PDEs describing a plurality of elements included in the PPR graph, a PPR-PDE describing the ingress NE including a source flag, and a PPR-PDE describing the egress NE including a destination flag. The means for transmitting 1706 includes a means for transmitting the PPR information describing the PPR graph to a headend NE of the network.

Figure 18:
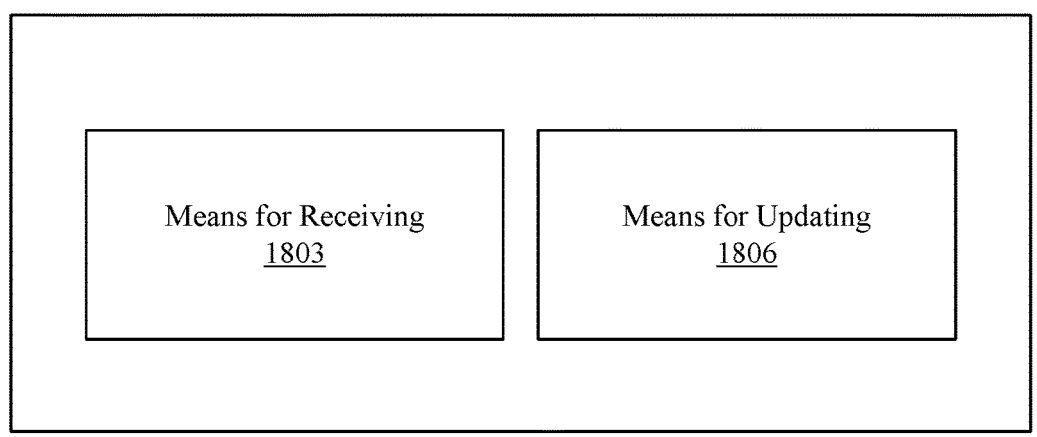

FIG. 18 shows another apparatus 1800 for advertising and programming a PPR graph according various embodiments of the disclosure. The apparatus 1800 comprises a means for receiving 1803 and a means for updating 1806. The means for receiving 1803 includes a means for receiving PPR information describing a PPR graph, the PPR graph representing a plurality of PPRs between an ingress NE and an egress NE in the network, the PPR information including a PPR-ID associated with the egress NE and a plurality of PPR-PDEs describing a plurality of elements included in the PPR graph, a PPR-PDE describing the ingress NE including a source flag, and a PPR-PDE describing the egress NE including a destination. The means for updating 1806 includes a means for a forwarding database to include a forwarding entry for the egress NE in response to identifying the NE in the plurality of PPR-PDEs, the forwarding entry indicating a next hop by which to forward a data packet comprising the PPR-ID.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) in a network, comprising:
    receiving, by the NE, preferred path route (PPR) information describing a PPR graph, the PPR graph representing a plurality of PPRs between one or more ingress NEs and one or more egress NEs in the network, the PPR information including a PPR graph identifier (PPG-ID), a PPR-identifier (PPR-ID), and a plurality of PPR-Path Description Elements (PPR-PDEs), the PPG-ID identifying the PPR graph, the PPR-ID being associated with the egress NE, the plurality of PPR-PDEs describing a plurality of elements included in the PPR graph, a PPR-PDE describing the ingress NE including a source flag and a PPR-PDE describing the egress NE including a destination flag; and
    updating, by the NE, a forwarding database to include a forwarding entry for the egress NE in response to identifying the NE in the plurality of PPR-PDEs excluding the PPR-PDE describing the egress NE, the forwarding entry indicating a next hop by which to forward a data packet comprising the PPR-ID.

2. The method of claim 1, wherein the PPR graph comprises a plurality of branches, wherein each branch comprises a plurality of elements on a path between two NEs included in the PPR graph.

3. The method of claim 1, wherein the PPR graph comprises a plurality of ingress NEs and only the egress NE, wherein the PPR graph comprises a plurality of branches, wherein each of the branches comprises a plurality of elements on a path connecting one of the ingress NEs to an NE along the path to the egress NE, wherein each of the plurality of branches includes at least one common NE, and wherein the method further comprises:
    sequentially searching, by the NE, a plurality of PPR-PDEs on a first branch of the plurality of branches to determine whether the NE is identified in one of the plurality of PPR-PDEs;
    determining, by the NE, the egress NE of the first branch based on the destination flag in response to being identified in the one of the plurality of PPR-PDEs; and
    generating, by the NE, the forwarding entry for the egress NE indicating that a next hop toward the egress NE is a next PPR-PDE of the plurality of PPR-PDEs.

4. The method of claim 1, wherein the PPR graph comprises a plurality of ingress NEs and a plurality of egress NEs, wherein the PPR graph comprises a plurality of branches, wherein each of the branches comprises a plurality of elements on a path connecting one of the ingress NEs to an NE along the path to one of the egress NEs, wherein each of the plurality of branches includes at least one common NE, and wherein the method further comprises:
    sequentially searching, by the NE, a plurality of PPR-PDEs on a first branch of the plurality of branches to determine whether the NE is identified in one of the plurality of PPR-PDEs;
    determining, by the NE, a plurality of egress NEs of the first branch in response to being identified in the one of the plurality of PPR-PDEs; and
    generating, by the NE, a plurality of forwarding entries for the plurality of egress NEs.

5. The method of claim 1, wherein the PPR information includes a flag indicating that the PPR graph is a bidirectional forest, wherein the PPR graph comprises a plurality of ingress NEs and a plurality of egress NEs, wherein the PPR graph comprises a plurality of branches, wherein each of the plurality of branches comprises a plurality of elements on a bidirectional path connecting one of the ingress NEs to an NE along the bidirectional path to one of the egress NEs, wherein each of the plurality of branches includes at least one common NE, and wherein the method further comprises:
    sequentially searching, by the NE, a plurality of PPR-PDEs on a first branch of the plurality of branches to determine whether the NE is identified in one of the plurality of PPR-PDEs;
    determining, by the NE, a first plurality of destinations along a first direction of the first branch in response to being identified in the one of the plurality of PPR-PDEs;

generating, by the NE, a plurality of forwarding entries for the first plurality of destinations;
determining, by the NE, a second plurality of destinations along a second direction of the first branch; and
generating, by the NE, a plurality of forwarding entries for the second plurality of destinations.

6. The method of claim 1, wherein the PPR information includes a policy group tag associated with one or more PPR graphs, wherein the one or more PPR graphs are assigned the policy group tag based on an attribute associated with the one or more PPR graphs, wherein the attribute is at least one of a traffic engineering (TE) parameter, network characteristic, or service requirement that is associated with a resource to be reserved on each of the one or more PPR graphs.

7. The method of claim 1, wherein the PPR information is received from another NE in the network as a plurality of fragments, wherein each fragment includes the PPG-ID, a fragment identifier, a last fragment flag, and a subset of the plurality of PPR-PDEs, wherein the fragment identifier indicates a sequence number of a respective fragment, and wherein the last fragment flag indicates whether the respective fragment is a last fragment representing the PPR graph of the plurality of fragments.

8. A network element (NE) implemented in a network, comprising:
a memory configured to store instructions; and
a processor coupled to the memory and configured to execute the instructions to cause the processor to be configured to:
receive preferred path route (PPR) information describing a PPR graph, the PPR graph representing a plurality of PPRs between one or more ingress NEs and one or more egress NEs in the network, the PPR information including a PPR graph identifier (PPG-ID), a PPR-identifier (PPR-ID), and a plurality of PPR-Path Description Elements (PPR-PDEs), the PPG-ID identifying the PPR graph, the PPR-ID being associated with the egress NE, the plurality of PPR-PDEs describing a plurality of elements included in the PPR graph, a PPR-PDE describing the ingress NE including a source flag and a PPR-PDE describing the egress NE including a destination flag; and
update a forwarding database to include a forwarding entry for the egress NE in response to identifying the NE in the plurality of PPR-PDEs excluding the PPR-PDE describing the egress NE, the forwarding entry indicating a next hop by which to forward a data packet comprising the PPR-ID.

9. The NE of claim 8, wherein the PPR graph comprises a plurality of branches, wherein each branch comprises a plurality of elements on a path between two NEs included in the PPR graph.

10. The NE of claim 8, wherein the PPR graph comprises a plurality of ingress NEs and only the egress NE, wherein the PPR graph comprises a plurality of branches, wherein each of the branches comprises a plurality of elements on a path connecting one of the ingress NEs to an NE along the path to the egress NE, wherein each of the plurality of branches includes at least one common NE, and wherein the instructions further cause the processor to be configured to:
sequentially search a plurality of PPR-PDEs on a first branch of the plurality of branches to determine whether the NE is identified in one of the plurality of PPR-PDEs;
determine the egress NE of the first branch based on the destination flag in response to being identified in the one of the plurality of PPR-PDEs; and
generate the forwarding entry for the egress NE indicating that a next hop toward the egress NE is a next PPR-PDE of the plurality of PPR-PDEs.

11. The NE of claim 8, wherein the PPR graph comprises a plurality of ingress NEs and a plurality of egress NEs, wherein the PPR graph comprises a plurality of branches, wherein each of the branches comprises a plurality of elements on a path connecting one of the ingress NEs to an NE along the path to one of the egress NEs, wherein each of the plurality of branches includes at least one common NE, and wherein the instructions further cause the processor to be configured to:
sequentially search a plurality of PPR-PDEs on a first branch of the plurality of branches to determine whether the NE is identified in one of the plurality of PPR-PDEs;
determine a plurality of egress NEs of the first branch in response to being identified in the one of the plurality of PPR-PDEs; and
generate a plurality of forwarding entries for the plurality of egress NEs.

12. The NE of claim 8, wherein the PPR information includes a flag indicating that the PPR graph is a bidirectional forest, wherein the PPR graph comprises a plurality of ingress NEs and a plurality egress NEs, wherein the PPR graph comprises a plurality of branches, wherein each of the plurality of branches comprises a plurality of elements on a bidirectional path connecting one of the ingress NEs to an NE along the bidirectional path to one of the egress NEs, wherein each of the plurality of branches includes at least one common NE, and wherein the instructions further cause the processor to be configured to:
sequentially search a plurality of PPR-PDEs on a first branch of the plurality of branches to determine whether the NE is identified in one of the plurality of PPR-PDEs;
determine a first plurality of destinations along a first direction of the first branch in response to being identified in the one of the plurality of PPR-PDEs;
generate a plurality of forwarding entries for the first plurality of destinations;
determine a second plurality of destinations along a second direction of the first branch; and
generate a plurality of forwarding entries for the second plurality of destinations.

13. The NE of claim 8, wherein the forwarding entry comprises an address prefix indicating the next hop, wherein the address prefix represents a plurality of NEs along a branch of the PPR graph.

14. The NE of claim 8, wherein the PPR information includes a type field indicating that the plurality of PPR-PDEs describes a tree, a forest, or a bidirectional forest.

15. A non-transitory computer readable medium configured to store a computer program product comprising computer executable instructions that, when executed by a processor of a network element (NE) implemented in a network, cause the processor to:
receive preferred path route (PPR) information describing a PPR graph, the PPR graph representing a plurality of PPRs between one or more ingress NEs and one or more egress NEs in the network, the PPR information including a PPR graph identifier (PPG-ID), a PPR-identifier (PPR-ID), and a plurality of PPR-Path Description Elements (PPR-PDEs), the PPG-ID identifying the PPR graph, the PPR-ID being associated with the egress NE, the plurality of PPR-PDEs describing a plurality of elements included in the PPR graph, a PPR-PDE describing the ingress NE including a source flag and a PPR-PDE describing the egress NE including a destination flag; and update a forwarding database to include a forwarding entry for the egress NE in response to identifying the NE in the plurality of PPR-PDEs excluding the PPR-PDE describing the egress NE, the forwarding entry indicating a next hop by which to forward a data packet comprising the PPR-ID.

16. The non-transitory computer readable medium of claim 15, wherein the PPR graph comprises a plurality of branches, wherein each branch comprises a plurality of elements on a path between two NEs included in the PPR graph.

17. The non-transitory computer readable medium of claim 15, wherein the PPR graph comprises a plurality of ingress NEs and only the egress NE, wherein the PPR graph comprises a plurality of branches, wherein each of the branches comprises a plurality of elements on a path connecting one of the ingress NEs to an NE along the path to the egress NE, wherein each of the plurality of branches includes at least one common NE.

18. The non-transitory computer readable medium of claim 15, wherein the PPR graph comprises a plurality of ingress NEs and a plurality of egress NEs, wherein the PPR graph comprises a plurality of branches, wherein each of the branches comprises a plurality of elements on a path connecting one of the ingress NEs to an NE along the path to one of the egress NEs, wherein each of the plurality of branches includes at least one common NE.

19. The non-transitory computer readable medium of claim 15, wherein the PPR information includes a flag indicating that the PPR graph is a bidirectional forest, wherein the PPR graph comprises a plurality of ingress NEs and a plurality of egress NEs, wherein the PPR graph comprises a plurality of branches, wherein each of the plurality of branches comprises a plurality of elements on a bidirectional path connecting one of the ingress NEs to an NE along the bidirectional path to one of the egress NEs, wherein each of the plurality of branches includes at least one common NE.

20. The non-transitory computer readable medium of claim 15, wherein a first PPR-PDE on a branch of the PPR graph includes a flag indicating that the branch is cyclical.

* * * * *

UNITED STATES PATENT AND TRADEMARK OFFICE
CERTIFICATE OF CORRECTION

| | | |
|---|---|---|
| PATENT NO. | : 11,632,322 B2 | Page 1 of 1 |
| APPLICATION NO. | : 17/110813 | |
| DATED | : April 18, 2023 | |
| INVENTOR(S) | : Toerless Eckert et al. | |

It is certified that error appears in the above-identified patent and that said Letters Patent is hereby corrected as shown below:

On the Title Page

Page 2, Column 2, Item (56) Other Publications:
Line 29, Delete "Hedge, S., "Tiaflic Accounting for MPLS Segment Routing Paths," draft-hegde-spring-traffic-accounting-for-sr-paths-01, Oct. 30, 2017, 14 pages." and insert
-- Hedge S., "Traffic Accounting for MPLS Segment Routing Paths," draft-hegde-spring-traffic-accounting-for-sr-paths-01, Oct. 30, 2017, 14 pages. --
Line 37, Delete "Revidi S., Ed., et al., "IPv6 Segment Routing Header (SRH)," draft-ietf-6man-segment-routing-header-08, Jan. 20, 2018, 35 pages." and insert
-- Previdi, S., Ed., et al., "IPv6 Segment Routing Header (SRH)," draft-ietf-6man-segment-routing-header-08, Jan. 20, 2018, 35 pages. --

Signed and Sealed this
Thirtieth Day of May, 2023

Katherine Kelly Vidal
*Director of the United States Patent and Trademark Office*